(12) United States Patent
Dighe et al.

(10) Patent No.: US 10,338,834 B1
(45) Date of Patent: Jul. 2, 2019

(54) APPLICATION PERFORMANCE IN REPLICATION ENVIRONMENTS

(71) Applicant: Veritas Technologies LLC, Mountain View, CA (US)

(72) Inventors: Sumit Dighe, Maharashtra (IN); Shailesh Marathe, Maharashtra (IN)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 15/279,763

(22) Filed: Sep. 29, 2016

(51) Int. Cl.
*G06F 3/06* (2006.01)

(52) U.S. Cl.
CPC ............ *G06F 3/0622* (2013.01); *G06F 3/065* (2013.01); *G06F 3/067* (2013.01); *G06F 3/0659* (2013.01)

(58) Field of Classification Search
None
See application file for complete search history.

(56) References Cited

U.S. PATENT DOCUMENTS

| | | | | |
|---|---|---|---|---|
| 8,341,115 | B1 | 12/2012 | Natanzon | 707/613 |
| 8,935,206 | B2* | 1/2015 | Aguilera | G06F 11/1464 |
| | | | | 707/637 |
| 8,990,453 | B1 | 3/2015 | Bora | 710/29 |
| 2004/0267706 | A1* | 12/2004 | Springer, Sr. | G06F 3/061 |
| 2013/0226870 | A1* | 8/2013 | Dash | G06F 3/0619 |
| | | | | 707/634 |
| 2013/0332558 | A1* | 12/2013 | Condict | G06F 3/0641 |
| | | | | 709/214 |
| 2014/0351534 | A1* | 11/2014 | Crawford | G06F 3/065 |
| | | | | 711/162 |
| 2015/0199141 | A1 | 7/2015 | Faulkner | 711/103 |
| 2015/0242144 | A1 | 8/2015 | Saito | 711/162 |
| 2015/0278331 | A1 | 10/2015 | Blea | 707/610 |
| 2015/0370827 | A1* | 12/2015 | Parkison | G06F 17/30215 |
| | | | | 707/626 |
| 2016/0328436 | A1* | 11/2016 | Govind | G06F 17/30168 |
| 2017/0160980 | A1* | 6/2017 | Golander | G06F 3/0643 |

* cited by examiner

*Primary Examiner* — Mano Padmanabhan
*Assistant Examiner* — William E. Baughman
(74) *Attorney, Agent, or Firm* — Campbell Stephenson LLP

(57) ABSTRACT

Disclosed herein are methods, systems, and processes to improve application performance in replication environments. A read command configured to cause a read operation to be performed on a unit of storage in a data volume is received. A state of a lock is determined. The state of the lock indicates whether a write operation is ongoing, and the write operation results in data being written to a storage replication log and to the data volume. The write operation is ongoing because writing the data to the storage replication log and to the data volume has not completed. In response to a determination that the write operation is not ongoing, the read operation is allowed to be performed on the unit of storage.

20 Claims, 17 Drawing Sheets

APPLICATION PERFORMANCE IN REPLICATION ENVIRONMENTS

FIELD OF THE DISCLOSURE

This disclosure relates to data replication. In particular, this disclosure relates to improving application performance in replication environments.

DESCRIPTION OF THE RELATED ART

Replication involves copying data from one physical location (e.g., a primary site) to another, typically remote, physical location (e.g., a secondary site). When data is generated by an application in the primary site, such data can be copied to a log on the primary site (e.g., a storage replication log (SRL)), and then, from the log, to a data volume, also on the primary site. The data is also replicated (or copied) from the primary site to a backup data volume on the secondary site. In this manner, replication can be performed in the background without affecting application performance in the primary site.

An SRL (e.g., a front end log) stores data until the data is committed (or copied) to the data volume. As noted above, in certain replication environments, both the SRL and the data volume are implemented in the primary site. In such replication environments, asynchronous write acknowledgement involves signaling write completion to the application when data generated by the application is written to the SRL without waiting for the data to be written to the data volume. Conversely, synchronous write acknowledgement involves signaling write completion to the application only when data generated by the application is written to both the SRL and the data volume.

However, it will be appreciated that in certain cases, an application may attempt to read data, before that data is written to the data volume from the SRL. In such cases, the reads generated by the application fail. While such failures avoid supplying the application with stale data, such failures result in wasted time and computing resources. Therefore, handling reads in this manner has a negative impact on application performance.

SUMMARY OF THE DISCLOSURE

Disclosed herein are methods, systems, and processes to improve application performance in replication environments. One such method involves receiving a read command configured to cause a read operation to be performed on a unit of storage in a data volume. The method then determines a state of a lock. The state of the lock indicates whether a write operation is ongoing, and the write operation results in data being written to a storage replication log and to the data volume.

In this example, the write operation is ongoing because writing the data to the storage replication log and to the data volume has not completed. In response to a determination that the write operation is not ongoing, the method allows the read operation to be performed on the unit of storage.

In certain embodiments, the method assigns a current generation number to the data volume and receives a first request to lock the data volume. The first request is received due to the write operation, and the write operation is asynchronous. Upon receiving the first request, the method assigns the current generation number to the request, sets a synchronous write acknowledgement flag on the data volume, resets a current generation input/output (I/O) count of the data volume to zero, and increments the current generation number by one.

In some embodiments, the method receives a second request to lock the data volume to the read operation due to the write operation. The write operation is synchronous and ongoing. Upon receiving the second request, the method assigns the current generation number to the request, sets a no lock flag on the data volume to indicate that the read operation does not require the lock, resets the current generation I/O count of the data volume to zero, increments the current generation number by one, and sets an asynchronous write acknowledgement flag on the data volume.

In other embodiments, the method determines that the read operation or the write operation is associated with computing devices operating in a cluster. In this example, the data volume is part of multiple data volumes, and the data volumes are part of the cluster.

In certain embodiments, the method sets the synchronous write acknowledgement flag on the data volumes, resets the current generation I/O count of the data volumes to zero, increments the current generation number by one, waits for a previous generation I/O count to become zero, and sets the no lock flag on the data volumes.

In one embodiment, the method sets the no lock flag on the data volumes, resets the current generation I/O count of the data volumes to zero, increments the current generation number by one, and sets the asynchronous write acknowledgement flag on the data volumes.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings.

Figure 1A:
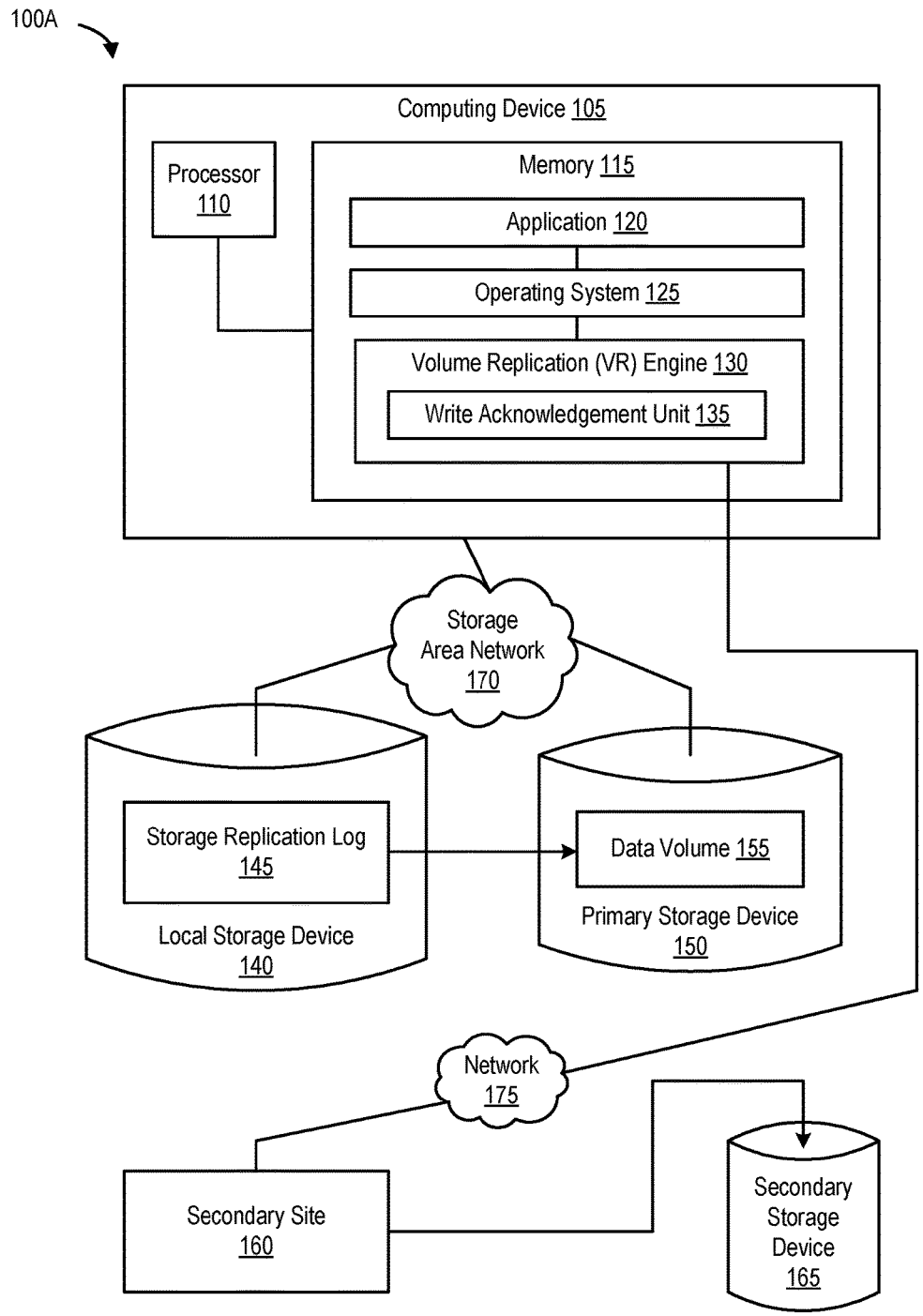
FIG. 1A is a block diagram of a computing system that can be configured to improve application performance in replication environments, according to one embodiment of the present disclosure.

While the disclosure is susceptible to various modifications and alternative forms, specific embodiments are provided as examples in the drawings and detailed description. The drawings and detailed description are not intended to limit the disclosure to the particular form disclosed. The intention is to cover all modifications, equivalents and alternatives falling within the spirit and scope of the disclosure as defined by the appended claims.

DETAILED DESCRIPTION

Introduction

Replication involves writing data at a primary site, and also to a secondary site. If a disaster occurs at the primary site, critical data can be restored to the primary site from the secondary site. As previously noted, it is preferable to perform replication in the background without affecting application performance in the primary site. For example, given the geographic distance between the primary site and the secondary site, replicating data between the two sites may take a significant amount of time. Therefore, while forcing an application executing on the primary site to wait for data to be committed to the secondary site, before a write generated by the application can be considered committed, and thus complete, guarantees consistency of the replicated data, doing so places an onerous burden on the waiting application.

A storage replication log (SRL) can be used to facilitate replication, where data generated by the application is first written to the SRL and then to a data volume. Both the SRL and the data volume are implemented in the primary site, typically on different physical storage devices (e.g., non-volatile storage units such as Solid State Drives (SSDs) and traditional Hard Disk Drives (HDDs), respectively). Therefore, the application does not have to wait for the data to be committed, and the actual replication of data from the primary site to the secondary site can take place in the background, with less stringent time constraints.

As previously noted, an SRL (e.g., a front end log implemented on the primary site), tracks, stores, and manages data until the data is committed (or copied) to the data volume. Data from the data volume is then written (or committed) to a backup data volume in the secondary site at a later time. Therefore, from the application's perspective, the entire write process takes place in the primary site. In such replication environments, asynchronous write acknowledgement involves signaling write completion to the application when data generated by the application is written to the SRL without waiting for the data to be written to the data volume. Conversely, synchronous write acknowledgement in such replication environments involves signaling write completion to the application only when data generated by the application is actually written to the data volume.

However, it is conceivable that the application may attempt to read data before that data is written to the data volume from the SRL. In such cases, read operations generated by the application can be intercepted and locked to avoid the risk of supplying the application with stale and/or potentially corrupt data, thus permitting (pending) write operation(s) to complete (e.g., from the SRL to the data volume) prior to allowing such a read operation to proceed. For example, if a write operation is pending on a region of a data volume, a read operation from the application to that region should be intercepted and blocked. Unfortunately, this "interlocking" between write operations and read operations in such replication environments can incur performance overages and negatively impacts application read performance.

The foregoing problem is exacerbated in cluster environments because, in cluster environments, the above-mentioned interlocking mechanism is implemented on and managed by a single node (e.g., a master node or a log owner node). In this scenario, other nodes in the cluster that are generating read operations have to coordinate with the master node to receive the required data. Therefore, managing read requests in cluster environments results in additional overhead on read operations and negatively impacts application performance because of the messaging that is invariably involved between these nodes and the master node.

Another problem arises if the SRL is created on a storage unit that is relatively faster (e.g., a SSD) compared to the storage unit on which the data volume is implemented (e.g., a HDD). In such cases, write operations generated by the application are flushed (e.g., written or committed) from the SRL to the data volume at a much slower pace, compared to the pace at which the write operation can be committed to the SRL and write completion can be signaled to the application (e.g., in the case of asynchronous write acknowledgement). Pending and accumulated write operations in such cases can cause a bottleneck between the SRL and the data volume, and can further degrade application performance in such replication environments.

Described herein are systems, methods, and processes to improve application performance in replication environments by switching write acknowledgement modes, and doing so without quiescing (or blocking) application input/output (I/O) operations.

Example System to Improve Application Performance in Replication Environments

FIG. 1A is a block diagram of a computing system 100A that can be configured to improve application performance in replication environments, according to one embodiment. Computing device 105 includes a processor 110 and a memory 115. Computing device 105 can be any type of computing system including a server, a desktop, a laptop, a tablet, and the like, and is communicatively coupled to a local storage device 140 and a primary storage device 150 via Storage Area Network (SAN) 170. However, it should be noted that computing device 105 can also be communicatively coupled to local storage device 140 and primary storage device 150 via other types of networks and/or interconnections (e.g., a Local Area Network (LAN), a Wide Area Network (WAN), the Internet, and/or the like).

Local storage device 140 and primary storage device 150 are communicatively coupled to a secondary site 160 via network 175. Secondary site is communicatively coupled to a backup storage device 165. Like SAN 170, network 175 can be any type of network and/or interconnection (e.g., LAN, a WAN, the Internet, and the like). Local storage device 140, primary storage device 150, and backup storage device 165 can include a variety of different storage devices (e.g., HDDs, SSDs, compact discs, digital versatile discs, Flash memory, and/or logical storage devices (e.g., volumes implemented on such physical storage devices)).

Memory 115 implements an application 120, an operating system (OS) 125, and a volume replication (VR) engine 130. VR engine 130 implements a write acknowledgement unit (WAU) 135. Local storage device 140 implements a storage replication log (SRL) 145, and primary storage device 150 implements a data volume 155. VR engine 130 performs replication operations between SRL 145 and data volume 155, and also between data volume 155 and backup storage device 165. As previously noted, SRL 145 is a type of front end log that can be used to perform primary site replication operations. SRL 145 tracks, stores, and manages data generated by application 120 (e.g., in the form of write operations) until the write operations are copied and committed to data volume 155 from SRL 145. SRL 145 also maintains the data generated by application 120 until the data is replicated to secondary site 160.

WAU 135, which is implemented by VR engine 130, manages write acknowledgement modes for write operations performed to SRL 145 and data volume 155. As previously mentioned, a write acknowledgement mode can asynchronous or asynchronous. In asynchronous write acknowledgement mode, WAU 135 communicates write completion to application 120 when data generated by application 120 is written to SRL 145 without waiting for the data to be written to data volume 155. Conversely, in synchronous write acknowledgement mode, WAU 135 communicates write completion to application 120 when data generated by application 120 is written to both SRL 145 and data volume 155.

Figure 1B:
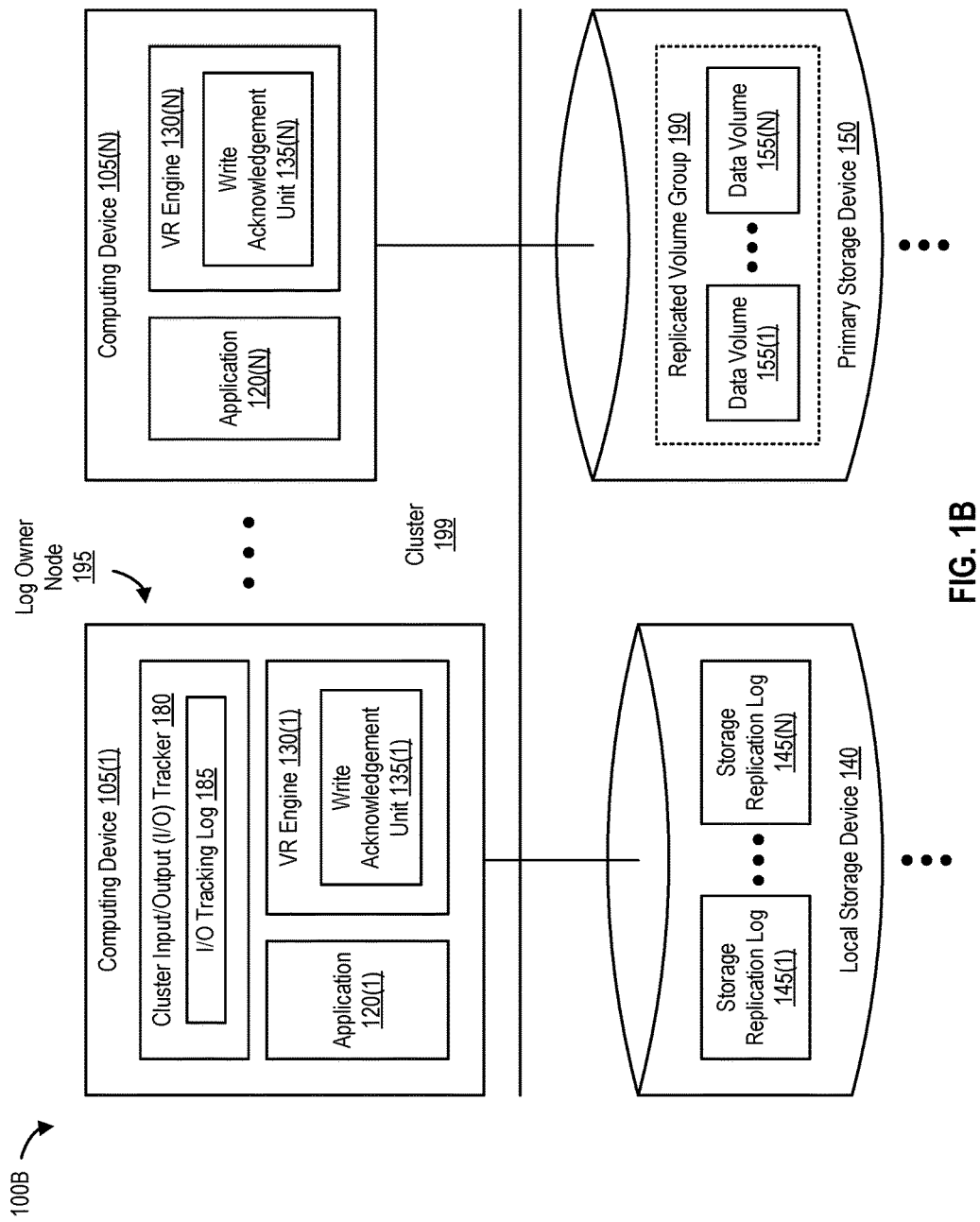
FIG. 1B is a block diagram of a computing cluster that performs volume replication, according to one embodiment of the present disclosure.

FIG. 1B is a block diagram of a computing cluster 100B that performs volume replication, according to one embodiment. As shown in FIG. 1B, cluster 199 includes computing devices 105(1)-(N). Computing device 105(1) is a log owner node 195. As previously noted, the interlocking of write operations and read operations can, for example, be implemented on and managed by log owner node 195. Applications (or application instances) executed by other nodes in cluster 199 which generate read operations, coordinate those read operations with computing device 105(1) to receive the requested data.

Computing device 105(1) includes a cluster input/output (I/O) tracker 180. Cluster write tracker 180 implements an I/O tracking log 185 which keeps track of write operations are pending between SRL 145 and data volume 155 as well as read operations generated by computing devices 105(1)-(N) in cluster 199 that are directed to storage region(s) in data volume 155 that are associated with the (pending) write operations. As shown in FIG. 1B, each computing device (or node) also executes an application and implements a VR engine. The VR engine implements a WAU. For example, computing device 105(1) executes application 120(1) and implements VR engine 130(1). VR engine 130(1) implements WAU 135(1). WAU 135(1) manages write acknowledgement modes (e.g., synchronous and asynchronous, among others) for write operations performed to SRL 145(1) and data volume 155(1) by computing device 105(1). Similarly, computing device 105(N) executes application 120(N) and implements VR engine 130(N). VR engine 130(N) implements WAU 135(N). WAU 135(N) manages modes write acknowledgement modes (e.g., synchronous and asynchronous, among others) for write operations performed to SRL 145(N) and data volume 155(N) by computing device 105(N).

As shown in FIG. 1B, local storage device 140 includes several SRLs (e.g., SRLs 145(1)-(N)). Each computing device in cluster 199 can have a dedicated SRL. For example, SRL 145(1) can be a dedicated SRL for computing device 105(1). However, in certain embodiments, several computing devices in cluster 199 can share the same SRL. For example, computing devices 105(1) and 105(2) can share SRL 145(1).

Similarly, primary storage device 150 includes several data volumes (e.g., data volumes 155(1)-(N)). Each computing device in cluster 199 can have a dedicated data volume. For example, data volume 155(1) can be a dedicated data volume for computing device 105(1). However, in some embodiments, several computing devices in cluster 199 can share the same data volume. For example, computing devices 105(1) and 105(2) can share data volume 155(1). Data volumes 155(1)-(N) are part of a replicated volume group 190. VR engine 130(1) can replicate one or more data volume in replicated volume group 190 to secondary site 160.

Example VR Engine and Write Acknowledgement Unit (WAU)

Figure 2:
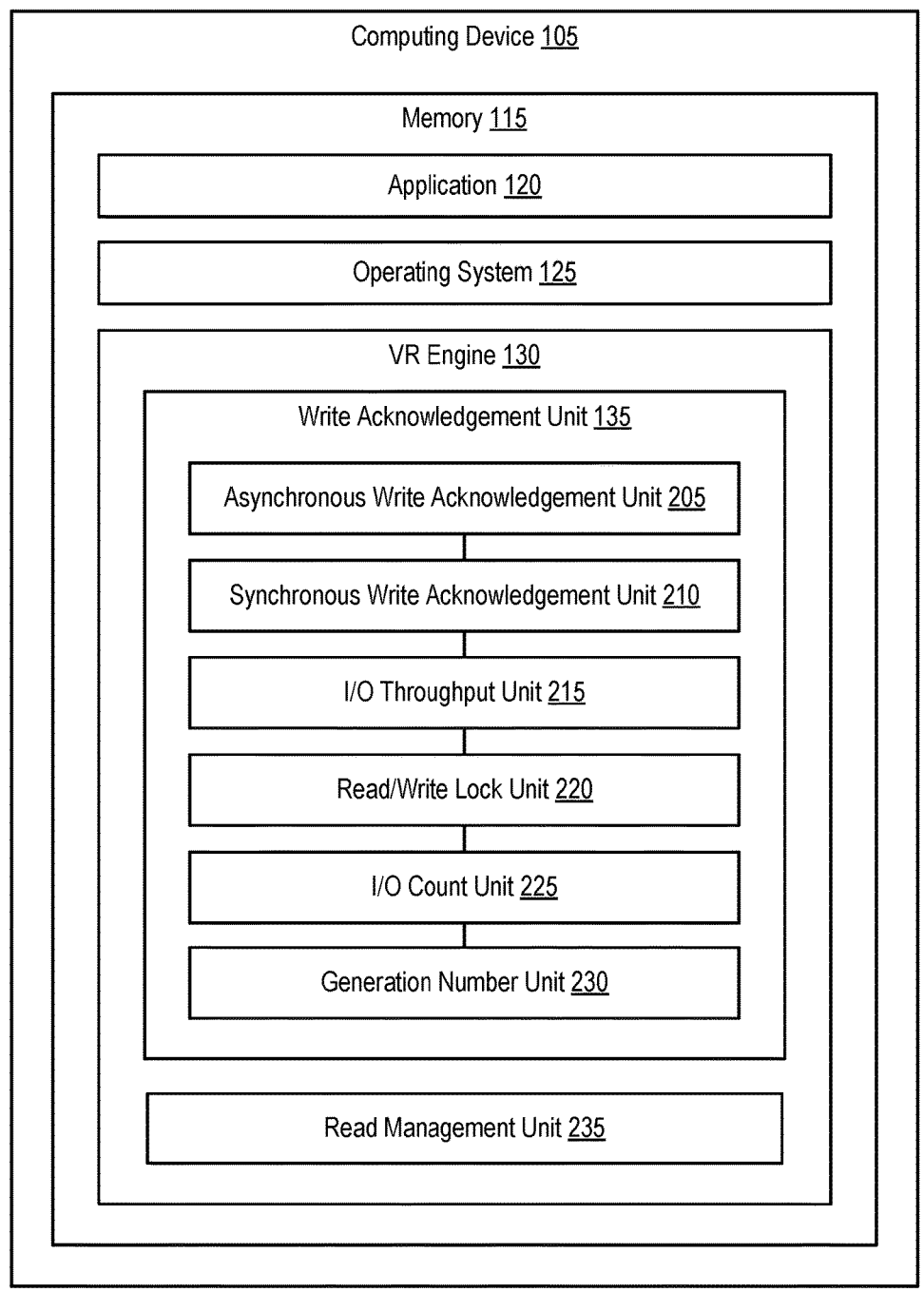
FIG. 2 is a block diagram of a computing system that implements a write acknowledgement unit, according to one embodiment of the present disclosure.

FIG. 2 is a block diagram of a computing system 200 that implements a write acknowledgement unit (WAU), according to one embodiment. As shown in FIG. 2, computing device 105 includes memory 115. Memory 115 executes application 120 and OS 125, and implements VR engine 130. VR engine 130 includes WAU 135 and a read management unit (RMU) 235. WAU 135 includes an asynchronous write acknowledgement unit (AWAU) 205, a synchronous write acknowledgement unit (SWAU) 210, an I/O throughput unit 215, a read/write lock unit 220, an I/O count unit 225, and a generation number unit 230.

AWAU 205 communicates write completion to application 120 when data generated by application 120 is written to SRL 145 without waiting for the data to be written to data volume 155. SWAU 210 communicates write completion to application 120 when data generated by application 120 is written to both SRL 145 and data volume 155. I/O throughput unit 215 is used by VR engine 130 to sample and calculate the I/O throughput of application 120 under various write acknowledgement modes (e.g., synchronous, asynchronous, and the like).

AWAU 205 also generates and maintains an asynchronous write acknowledgement flag (e.g., VOL_FLAG_WR_ASYNC) to indicate that a write operation generated by application 120 will be acknowledged as soon as the write operation is committed to SRL 145. Similarly, SWAU 210 generates and maintains a synchronous write acknowledgement flag (e.g., VOL_FLAG_WR_SYNC) to indicate that a write operation generated by application 120 will be acknowledged when the write operation is committed to SRL 145 and data volume 155. It should be noted that, in some embodiments, the asynchronous write acknowledgement flag and the synchronous write acknowledgement flag are mutually exclusive.

Read/write lock unit 220 intercepts one or more read operations generated by application 120 and locks a storage region on data volume 155 (e.g., an offset and a length) to those one or more read operations (e.g., a storage region on data volume 155 that is subject to a pending write operation from SRL 145 that has not completed). Therefore, read/write lock unit 220 avoids other threads from initiating I/O operations to the same storage region on data volume 155. Read/write lock unit 220 generates and maintains a lock flag (e.g., VOL_FLAG_RD_ILOCK) to indicate that a read request to a data volume must be intercepted and locked (e.g., blocked). Read/write lock unit 220 also generates and maintains a no lock flag (e.g., VOL_FLAG_RD_NOILOCK) to indicate that a read request to a data volume does not require interception and locking. It should be noted that, in some embodiments, the lock flag and the no lock flag are mutually exclusive.

Generation number unit 230 maintains "generation" and "generation number" information. A generation is an interval (e.g., a time period) during which a given data volume (e.g., data volume 155) is operating in a particular write acknowledgement mode (e.g., a synchronous write acknowledgement mode, an asynchronous write acknowledgement mode, or some other write acknowledgement mode). Concurrent I/O operations in the computing systems of FIGS. 1A, 1B, and 2 belong to a generation (e.g., a time period). A generation can be identified by a number (e.g., a generation number or gen_number). For example, a current (or active) generation (e.g., cur_gen) can have a current generation number of X, and a generation number that is less than X can be referred to a previous generation number associated with a previous generation (e.g., prev_gen).

I/O count unit 225 calculates and maintains a count of active interlocks at a given time (e.g., the number of read operations that are currently locked as a result of pending write operations). For example, when an I/O operation is generated by application 120, the I/O operation is part of the current generation. I/O count unit 225 counts each I/O operation of a particular generation (e.g., a generation I/O count or gen_iocount). I/O operations of the current generation can be referred to as a current generation I/O count (e.g., cur_gen.gen_iocount).

If a lock request is granted by read/write lock unit 220, generation number unit 230 assigns a current generation number to the lock request, and I/O count unit 225 increments the generation I/O count (e.g., gen_iocount) of the corresponding generation. When the lock request is released by read/write lock unit 220, I/O count unit decrements the generation I/O count (e.g., gen_iocount) of the corresponding generation.

Example of Switching the Write Acknowledgement Mode of a Data Volume

In one embodiment, WAU 135 identifies a first write acknowledgement mode of data volume 155. The first write acknowledgement mode is part of multiple write acknowledgement modes that include a synchronous write acknowledgement mode, an asynchronous write acknowledgement mode, among other write acknowledgement modes. WAU 135 then switches data volume 155 to a second write acknowledgement mode that is also part of the multiple write acknowledgement modes. In some embodiments, the second write acknowledgement mode is the synchronous write acknowledgement mode or the asynchronous write acknowledgement mode.

In certain embodiments, WAU 135 configures multiple data volumes (e.g., data volumes 155(1)-(N) in replicated volume group 190) to acknowledge one or more asynchronous write operations. WAU 135, in conjunction with I/O throughput unit 215, determines an I/O throughput associated with application 120, and configures the data volumes to acknowledge one or more synchronous write operations, based on the asynchronous I/O throughput. As used herein, I/O throughput refers to the total number of I/O operations (e.g., read operations and write operations) serviced by one or more data volumes to one or more applications.

In some embodiments, I/O throughput unit 215 generates a set of asynchronous I/O throughput samples associated with application by monitoring a first set of I/O operations issues by application 120 during a first fixed time interval. I/O throughput unit 215 then determines an asynchronous I/O throughput associated with application 120 using the set of asynchronous I/O throughput samples. In other embodiments, I/O throughput unit 215 generates a set of synchronous I/O throughput samples associated with application 120 by monitoring a second set of I/Os issued by application 120 during a second fixed time interval. I/O throughput unit 215 then determines a synchronous I/O throughput associated with application 120 using the set of synchronous I/O throughput samples, and compares the asynchronous I/O throughput and the synchronous I/O throughput. Based on the results of the comparison, WAU 135 configures data volume 155 to acknowledge one or more asynchronous write operations or one or more synchronous write operations.

It will be appreciated that one or more synchronous write operations and one or more asynchronous write operations can be performed to the same SRL (e.g., SRL 145), and that a single SRL can be shared between multiple data volumes. In addition, instead of configuring a single data volume to acknowledge either synchronous or asynchronous write operations, WAU 135 can configure a first data volume (e.g., data volume 155(1) in replicated volume group 190) to acknowledge one or more asynchronous write operations, and can configure a second data volume (e.g., data volume 155(2) in replicated volume group 190) to acknowledge one or more synchronous write operations.

In other embodiments, WAU 135 can re-configure data volumes 155(1)-(N) to acknowledge one or more asynchronous write operations. WAU 135 can then access I/O tracking log 185 and monitor write operations pending in I/O tracking log 185. Based on the monitoring, WAU 135 can throttle one or more subsequent write operations generated by application 120 (e.g., if the pending write operations exceed a given maximum pending value). WAU 135 can also vary the delay value of the throttling by monitoring the I/O throughput of the asynchronous write operations and can switch the write acknowledgement mode of data volumes to 155(1)-(N) to a synchronous write acknowledgement mode.

VR engine 130(1) can provide automatic switching of a write acknowledgement mode of data volumes between synchronous and asynchronous based on application throughput. For example, VR engine 130(1) first sets the write acknowledgement modes of data volumes 155(1)-(N) in replicated volume group 190 to an asynchronous write acknowledgement mode (e.g., write_ack=ASYNC). VR engine 130(1) then uses I/O throughput unit 215 to sample the I/O throughput of application 120(1) (e.g., at least 3 samples of I/O throughput of application 120(1) including reads and writes, where each sample is of a fixed time interval (e.g., 1 minute)). I/O throughput unit 215 then calculates the average I/O throughput of application 120(1) using the collected samples (e.g., Throughput_ASYNC).

Next, VR engine 130(2) sets the write acknowledgement modes of data volumes 155(1)-(N) in replicated volume group 190 to a synchronous write acknowledgement mode (e.g., write_ack=SYNC). VR engine 130(1) then uses I/O throughput unit 215 to sample the I/O throughput of application 120(1) (e.g., at least 3 samples of I/O throughput of application 120(1) including reads and writes, where each sample is of a fixed time interval (e.g., 1 minute)). I/O throughput unit 215 then calculates the average I/O throughput of application 120(1) using the collected samples (e.g., Throughput_SYNC).

Finally, VR engine 130(1) compares the average I/O throughput of application 120(1) (e.g., compares Throughput_ASYNC and Throughput_SYNC) and switches the write acknowledgement mode of data volumes 155(1)-(N) based on the comparison. For example, if there is a significant difference between Throughput_ASYNC and Throughput_SYNC, WAU 135(1) sets data volumes 155(1)-(N) to the write acknowledgement mode that provides the higher throughput for application 120(1).

However, as previously noted, VR engine 130 can set the write acknowledgement mode of different data volumes to different write acknowledgement modes. For example, based on sampling the I/O throughput of a given application, WAU 130 can set or switch the write acknowledgement mode of data volume 155(1) to synchronous, and the write acknowledgement mode of data volume 155(2) to asynchronous, or vice-versa.

Example of Switching Write Acknowledgement Modes without Quiescing I/Os

Switching the write acknowledgement mode of a data volume from a first write acknowledgement to a second write acknowledgement mode, and vice-versa, can incur associated performance-related costs. For example, and as noted previously, switching the write acknowledgement mode of data volumes can cause the blocking/quiescing of application I/O operations on replicated volume group 190.

In one embodiment, read/write lock unit 220 receives a read command that is configured to cause a read operation to be performed on a unit of storage (e.g., on a storage region of data volume 155). Read/write lock unit 220 determines a state of a lock. In this example, the lock indicates whether a write operation that results in data being written to SRL 145 and to data volume 155 is ongoing (e.g., because writing the data to both SRL 145 and data volume 155 has not completed). Read/write lock unit 220 then determines that the write operation is not ongoing and allows the read operation to be performed on the unit of storage.

In some embodiments, generation number unit 230 assigns a current generation number (e.g., cur_gen.gen_number) to data volume 155. Read/write lock unit 220 then receives a first request to lock data volume 155 (e.g., because of an asynchronous write operation that has only been written to SRL 145 and not to data volume 155 and is thus, pending and causes read/write lock unit 220 to lock subsequent I/O operation(s) (e.g., a read operation) to corresponding region(s) of data volume 155).

Therefore, upon receiving the first request to lock data volume 155, generation number unit 230 assigns the current generation number (e.g., cur_gen.gen_number) to the request, sets a synchronous write acknowledgement flag (e.g., VOL_FLAG_WR_SYNC) on data volume 155, resets a current generation I/O count (e.g., cur_gen.gen_iocount) of data volume 155 to zero, and increments the current generation number (e.g., cur_gen.gen_number) by one. Consequently, from this point on, subsequent requests to lock one or more storage regions of data volume 155 will belong to a new generation.

In other embodiments, read/write lock unit 220 receives a second request to lock data volume 155 to a read operation (e.g., due to a synchronous write operation). Upon receiving the second request to lock data volume 155, generation number unit 230 assigns the current generation number (e.g., cur_gen.gen_number) to the (second request). Read/write lock unit 220 then sets a no lock flag (e.g., VOL_FLAG_RD_NOILOCK) on data volume 155 to indicate that the read operation does not need to be locked. I/O count unit 225 then resets the current generation I/O count (e.g., cur_gen.gen_iocount) of data volumes 155 to zero, and generation number unit 230 increments the current generation number (e.g., cur_gen.gen_number) by one. Finally, AWAU 205 sets the asynchronous write acknowledgement flag (e.g., VOL_FLAG_WR_ASYNC) on data volume 155 to indicate that a write operation generated by application 120 will be acknowledged as soon as the write operation is committed to SRL 145, without waiting for the write operation to be committed to data volume 155.

Changing or switching a write acknowledgement mode from asynchronous to synchronous if no cluster is involved, includes changing the generation number (e.g., gen_number) by setting the VOL_FLAG_WR_SYNC flag on data volume 155, adding the details (e.g., cur_gen.gen_iocount and prev_gen.gen_iocount) of the current generation (e.g., cur_gen) and previous generation (e.g., prev_gen), and resetting the cur_gen.gen_iocount to 0, and incrementing the cur_gen.gen_number by 1. It will be appreciated that, from this point, all subsequent lock requests for data volume 155 will belong to a new generation. Finally, read/write lock unit 220 waits for a previous generation I/O count (e.g., prev_gen.gen_iocount) to become 0, and once the previous generation I/O count reaches 0, read/write lock unit 220 sets the VOL_FLAG_RD_NOILOCK on data volume 155.

Changing or switching a write acknowledgement mode from synchronous to asynchronous if no cluster is involved, includes changing the generation number (e.g., gen_number) by setting the VOL_FLAG_RD_ILOCK flag on data volume 155, adding the cur_gen.gen_iocount of cur_gen and the prev_gen.gen_iocount of prev_gen, resetting the cur_gen.gen_iocount to 0, and incrementing the cur_gen.gen_number by 1. Finally, AWAU 205 sets the VOL_FLAG_WR_ASYNC on data volume 155 to indicate that no waiting is required for the previous generation of I/Os to finish, as any future read operations will be locked.

Example of Switching Write Acknowledgement Modes in a Cluster

As previously noted, cluster 199 implements log owner node 195. Log owner node 195 is responsible for granting lock requests for I/O operations generated by the other nodes in cluster 199. Log owner node 195 also keeps track of generation changes (e.g., using cluster I/O tracker 180 and I/O tracking log 185).

Switching or changing a write acknowledge mode from asynchronous to synchronous in cluster 199 is performed in two phases. In the first phase, to change the generation number, SWAU 210 first sets the synchronous write acknowledgement flag (e.g., VOL_FLAG_WR_SYNC) on data volumes 155(1)-(N) in cluster 199, I/O count unit adds the details (e.g., cur_gen.gen_iocount and prev_gen.gen_iocount) of the current generation (e.g., cur_gen) and previous generation (e.g., prev_gen), and resets the current generation I/O count (e.g., cur_gen.gen_iocount) of data volumes 155(1)-(N) to 0, and generation number unit 230 then increments the current generation number (e.g., cur_gen.gen_number) by 1. It will be appreciated that, at this point, all subsequent lock requests to data volumes 155(1)-(N) will belong to a new generation. Finally, I/O count unit 225 waits for a previous generation I/O count (e.g., prev_gen.gen_iocount) to become 0. If the first phase is successful, a second phase is initiated where read/write lock unit 220 sets the no lock flag (e.g., VOL_FLAG_RD_NOILOCK) on data volumes 155(1)-(N) in cluster 199.

Switching or changing a write acknowledge mode from synchronous to asynchronous in cluster 199 is also performed in two phases. In the first phase, to change the generation number, read/write lock unit 220 first sets the VOL_FLAG_RD_ILOCK on data volumes 155(1)-(N) in cluster 199, I/O count unit adds the cur_gen.gen_iocount of cur_gen and prev_gen.gen_iocount of prev_gen, and resets the cur_gen.gen_iocount of data volumes 155(1)-(N) to 0. Generation number unit 230 then increments the cur_gen.gen_number by 1. It will be appreciated that, at this point, all subsequent lock requests will belong to a new generation. If the first phase is successful, a second phase is initiated where AWAU 205 sets the VOL_FLAG_WR_ASYNC on data volumes 155(1)-(N) in cluster 199.

Processes to Improve Application Performance in Replication Environments

Figure 3A:
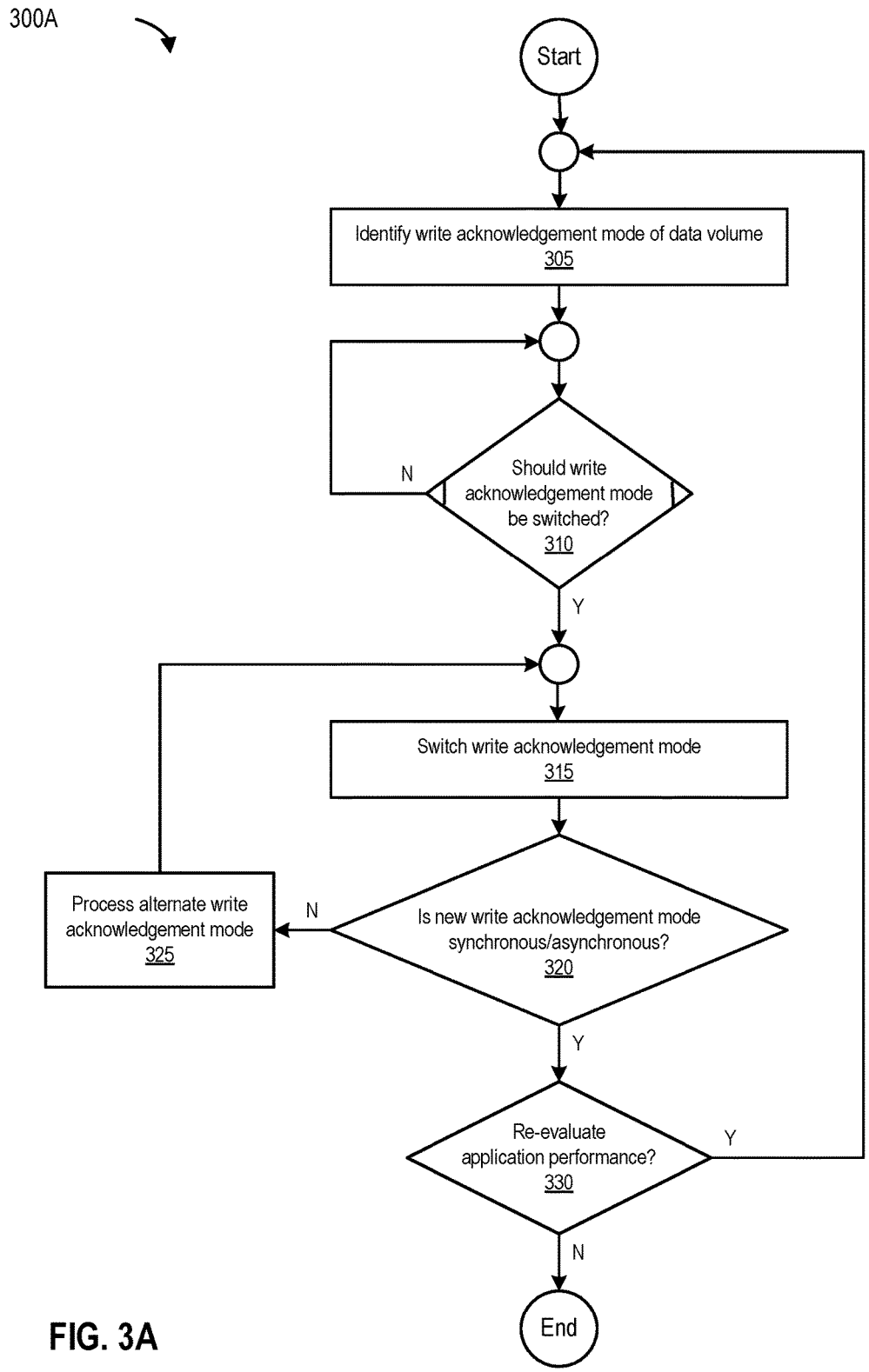
FIG. 3A is a flowchart that illustrates a process for switching write acknowledgement modes, according to one embodiment of the present disclosure.

FIG. 3A is a flowchart 300A that illustrates a process for switching write acknowledgement modes, according to one embodiment. The process begins at 305 by identifying a write acknowledgement mode (e.g., asynchronous write acknowledgement mode, synchronous write acknowledgement, or some other type of write acknowledgement mode) of a data volume (e.g., data volume 155). At 310, the process determines whether the write acknowledgement mode of the data volume should be switched. If the write acknowledgement mode of the data volume should not be switched, the process loops back to 310. However, if the write acknowledgement mode of the data volume should be switched, the process, at 315, switches the write acknowledgement mode, and at 320 determines whether the new write acknowledgement mode is a synchronous write acknowledgement mode or an asynchronous write acknowledgement mode.

If the new write acknowledgement mode is not a synchronous write acknowledgement mode or an asynchronous write acknowledgement mode, the process, at 325, processes an alternate write acknowledgement mode, and loops back to 315. However, if the new write acknowledgement mode is a synchronous write acknowledgement mode or an asynchronous write acknowledgement mode, the process, at 330, determines whether application performance has to be re-evaluated. If application performance (e.g., I/O throughput of the application, and the like) has to be re-evaluated, the process loops back to 305. Otherwise, the process ends.

Figure 3B:
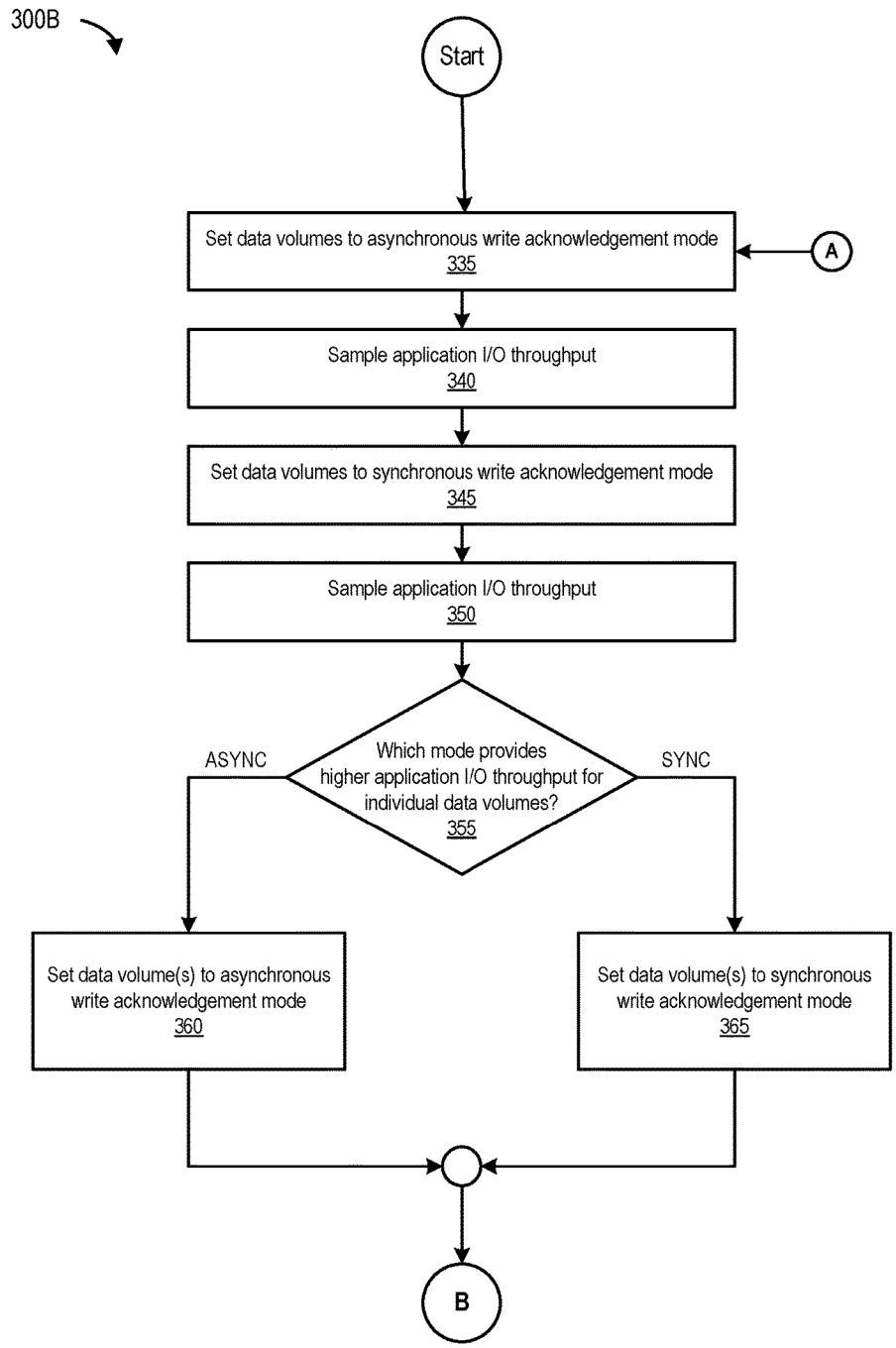
FIG. 3B is a flowchart that illustrates a process for selecting a write acknowledgement mode, according to one embodiment of the present disclosure.
Figure 3C:
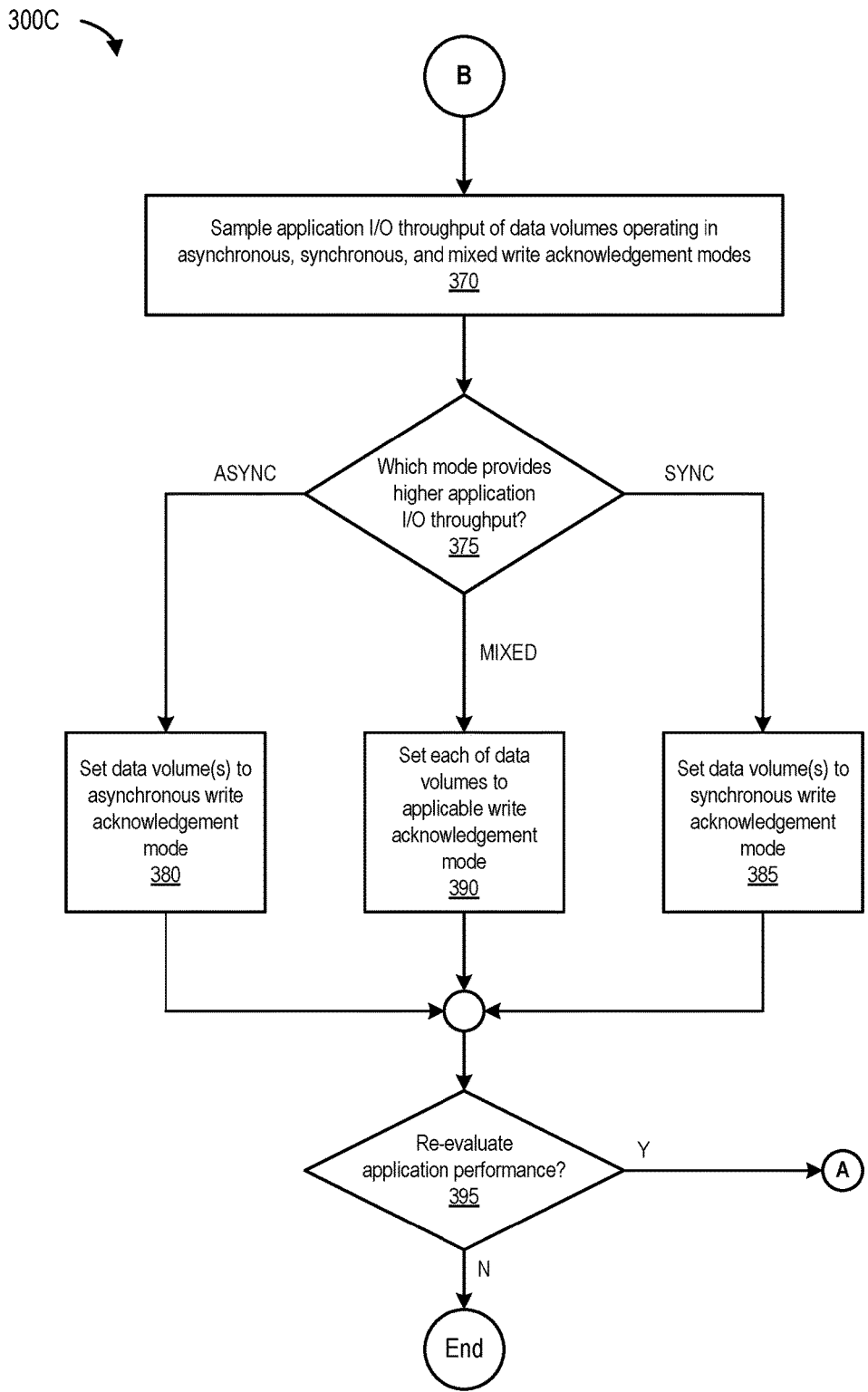
FIG. 3C is a flowchart that illustrates a process for selecting a write acknowledgement mode, according to one embodiment of the present disclosure.

FIGS. 3B and 3C are flowcharts 300B and 300C, respectively, that illustrate processes for selecting a write acknowledgement mode, according to certain embodiments. The process of FIG. 3B selects between asynchronous and synchronous write acknowledgement modes, and begins at 335 by setting data volumes (e.g., data volumes 155(1)-(N)) to an asynchronous write acknowledgement mode. At 340, the process samples application I/O throughput (e.g., three samples of I/O throughput of application 120(1)).

At 345, the process sets the data volumes to a synchronous write acknowledgement mode, and at 350, samples application I/O throughput. At 355, the process determines which write acknowledgement mode provides a higher application I/O throughput for individual data volumes. If the asynchronous write acknowledgement mode provides the higher application I/O throughput for individual data volumes, the process, at 360, sets a first set of data volume(s) to the asynchronous write acknowledgement mode. However, if the synchronous write acknowledgement mode provides the higher application I/O throughput, the process, at 365, sets a second set of data volume(s) to the synchronous write acknowledgement mode. The process continues in FIG. 3C.

The process of FIG. 3B continues at 370 by sampling the application I/O throughput of data volumes operating in asynchronous, synchronous, and mixed write acknowledgement modes. At 375, the process determines which mode provides the higher application I/O throughput. If the asynchronous write acknowledgement mode provides the higher application I/O throughput, the process, at 380, sets the data volume(s) to the asynchronous write acknowledgement mode. If the synchronous write acknowledgement mode provides the higher application I/O throughput, the process, at 385, sets the data volume(s) to the synchronous write acknowledgement mode.

However, if both asynchronous and synchronous write acknowledgement modes provide higher application I/O throughput (e.g., to different data volumes), the process, at 390, sets each data volume to an applicable write acknowledgement mode (e.g., synchronous, asynchronous, and the like). At 395, the process determines whether application performance has to be re-evaluated. If application performance (e.g., I/O throughput of the application, read performance, and the like) has to be re-evaluated, the process loops back to 335 in FIG. 3B. Otherwise, the process ends. It will be appreciated that in some embodiments, each data volume (or one or more sets of data volumes) in a replicated volume group can be set (or assigned) to a given write acknowledgement mode. On the contrary, in other embodiments, each data volume in the replicated group can be set to the same write acknowledgement mode. The write acknowledgement mode a given data volume is set to can depend on application I/O throughput, in addition to various other application performance evaluation metrics.

Figure 4A:
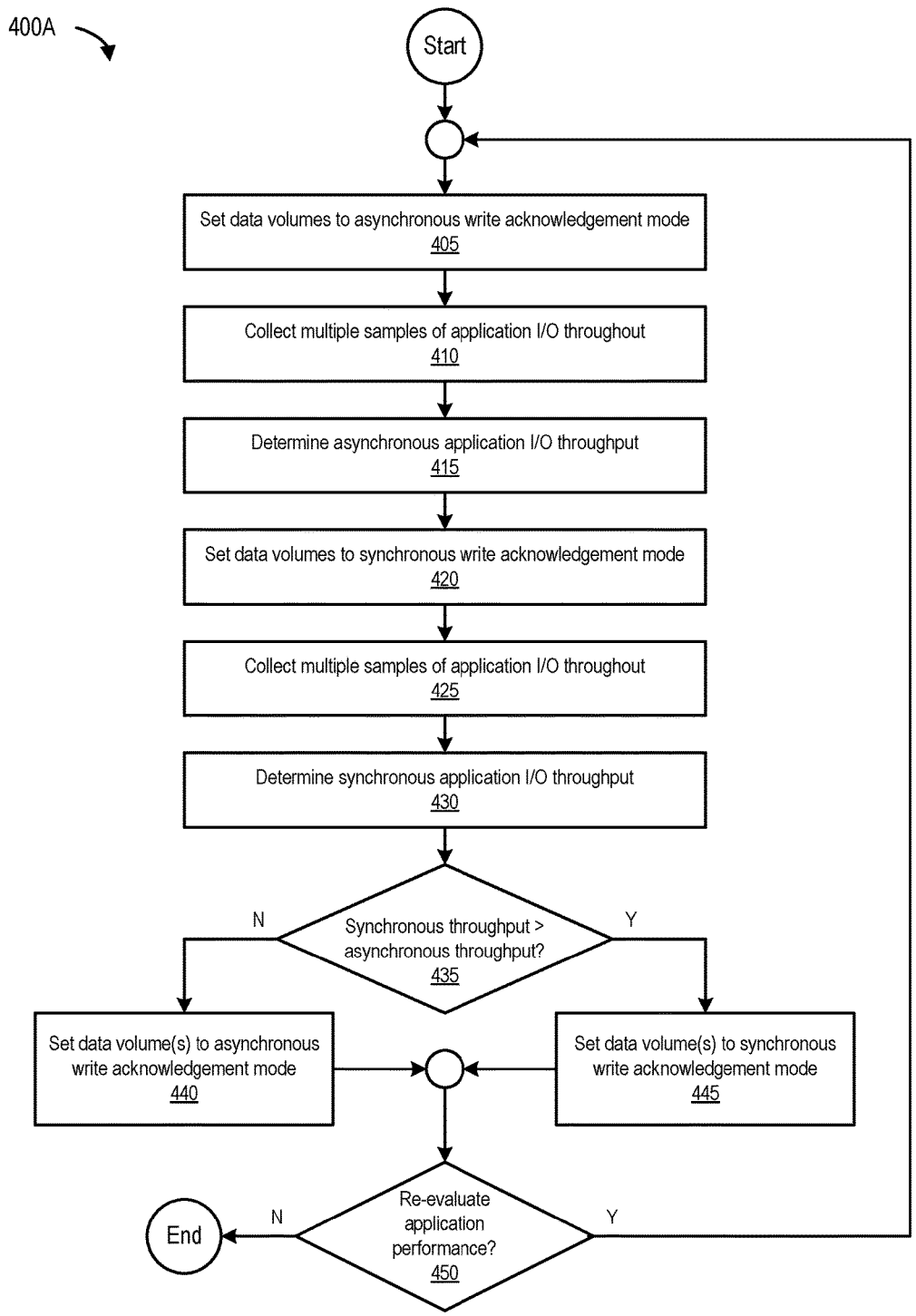
FIG. 4A is a flowchart that illustrates a process for comparing various write acknowledgement modes, according to one embodiment of the present disclosure.

FIG. 4A is a flowchart that illustrates a process 400A for comparing various write acknowledgement modes, according to one embodiment. The process begins at 405 by setting data volumes to an asynchronous write acknowledgement mode (e.g., write_ack_async). At 410, the process collects multiple (e.g., 3 or more) samples of application I/O throughput. At 415, the process determines an asynchronous application I/O throughput (e.g., Throughput_ASYNC). At 420, the process sets the data volumes to a synchronous write acknowledgement mode (e.g., write_ack_sync). At 425, the process collects multiple samples (e.g., 3 or more) of application I/O throughput, and at 430, determines a synchronous application I/O throughput (e.g., Throughput_SYNC).

At 435, the process determines whether the synchronous application I/O throughput is greater than the asynchronous application I/O throughput. If Throughput_SYNC is less than or equal to Throughput_ASYNC, the process, at 440, sets the data volume(s) to the asynchronous write acknowledgement mode. However, if Throughput_SYNC is greater than Throughput_ASYNC, the process, at 445, sets the data volume(s) to the synchronous write acknowledgement mode. At 450, the process determines whether application performance has to be re-evaluated. If application performance (e.g., I/O throughput of the application, and the like) has to be re-evaluated, the process loops back to 405. Otherwise, the process ends.

Figure 4B:
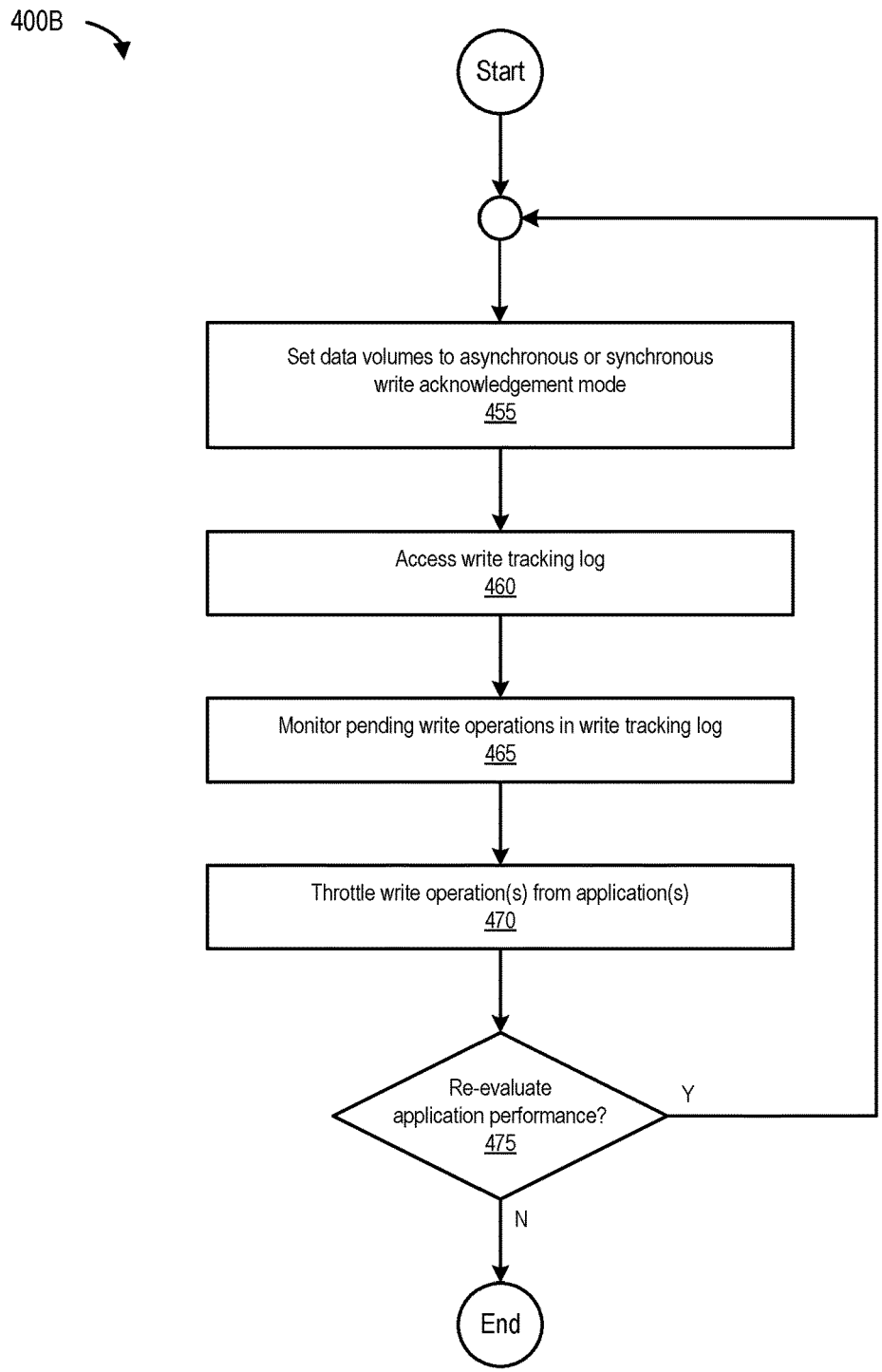
FIG. 4B is a flowchart that illustrates a process for throttling write operations, according to one embodiment of the present disclosure.

FIG. 4B is a flowchart that illustrates a process 400B for throttling write operations, according to one embodiment. The process begins at 455 by setting data volumes to an asynchronous or a synchronous write acknowledgement mode. At 460, the process accesses a write tracking log (e.g., I/O tracking log 185). At 465, the process monitors pending write operations in the write tracking log. At 470, the process throttles write operation(s) from application(s). At 475, the process determines whether application performance has to be re-evaluated. If application performance (e.g., I/O throughput of the application, and the like) has to be re-evaluated, the process loops back to 455. Otherwise, the process ends. It will be appreciated that the processes of FIGS. 4A and 4B can be used to switch write acknowledgement modes of data volumes based at least on application I/O throughput, among various other application performance evaluation metrics (e.g., I/O response time, I/O latency, I/Os per second (IOPS), and/or the like).

Figure 5A:
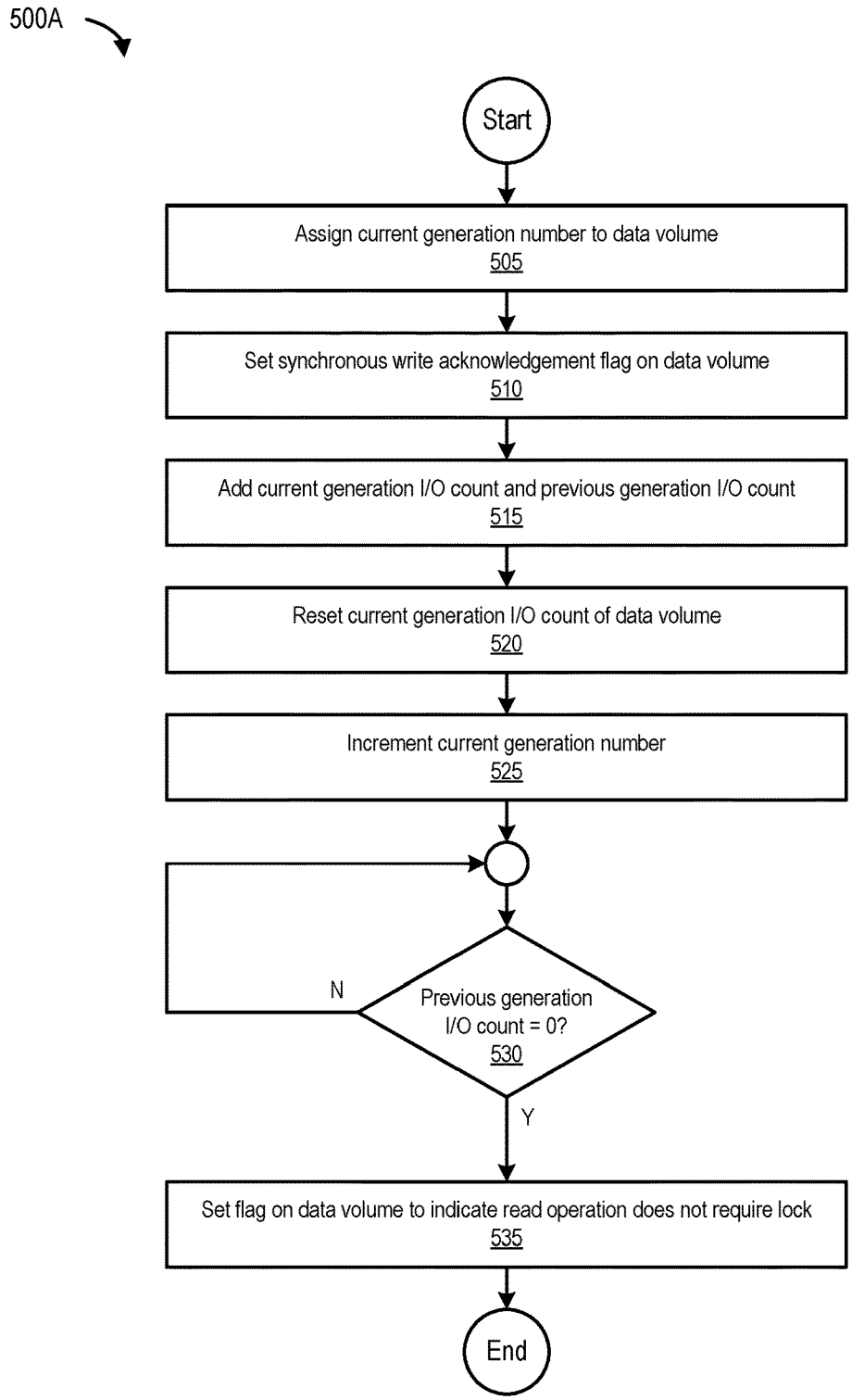
FIG. 5A is a flowchart that illustrates a process for switching a write acknowledgement mode from asynchronous to synchronous, according to one embodiment of the present disclosure.

FIG. 5A is a flowchart that illustrates a process 500A for switching a write acknowledgement mode of a data volume from asynchronous to synchronous, according to one embodiment. The process begins at 505 by assigning a current generation number to a data volume (e.g., data volume 155). At 510, the process sets a synchronous write acknowledgement flag on the data volume. At 515, the process adds a current generation I/O count and a previous generation I/O count, and at 520, resets the current generation I/O count (e.g., to 0).

At 525, the process increments the current generation number (e.g., by 1), and at 530, determines whether the previous generation I/O count is 0. If the previous generation I/O count is not 0, the process loops back to 530. However, if the previous generation I/O count is 0, the process ends at 535 by setting a flag on the data volume to indicate that a read operation does not require a lock (e.g., VOL_FLAG_RD_NOILOCK).

Figure 5B:
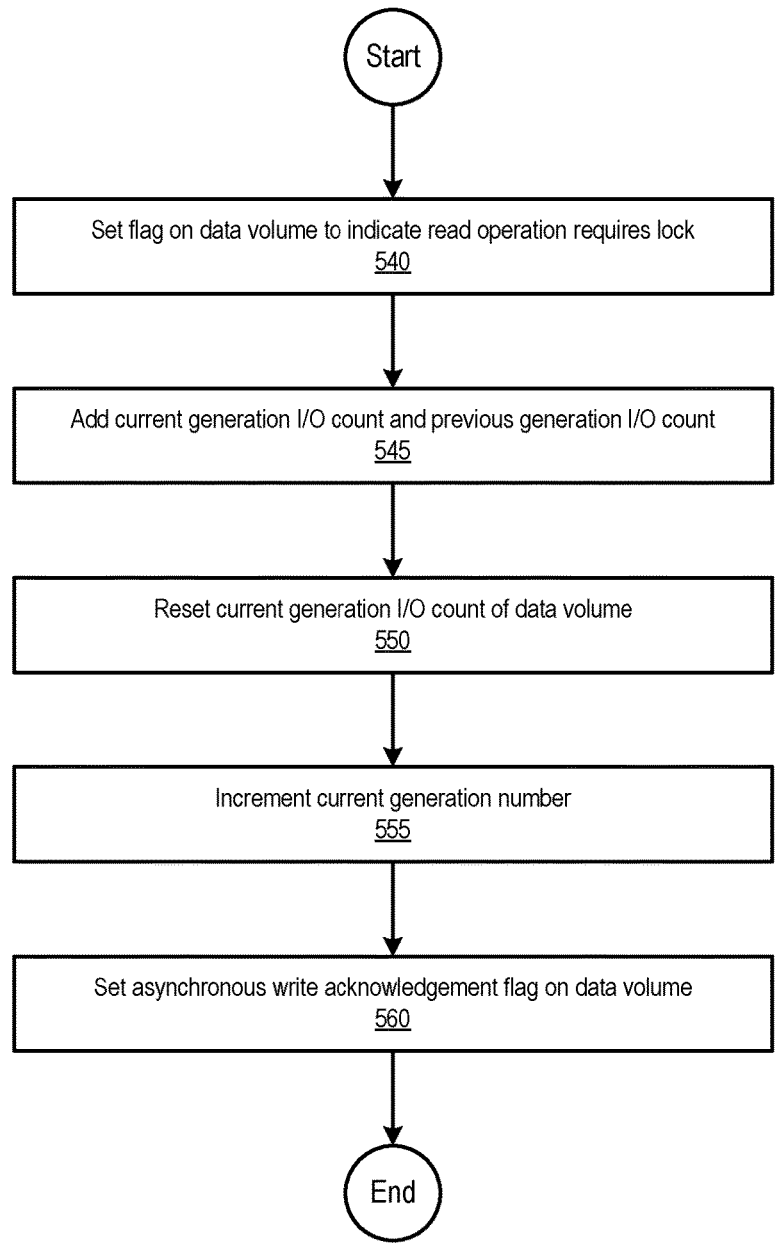
FIG. 5B is a flowchart that illustrates a process for switching a write acknowledgement mode from synchronous to asynchronous, according to one embodiment of the present disclosure.

FIG. 5B is a flowchart that illustrates a process 500B for switching a write acknowledgement mode from synchronous to asynchronous, according to one embodiment. The process begins at 540 by setting a flag on a data volume (e.g., data volume 155) to indicate that a read operation requires a lock (e.g., VOL_FLAG_RD_ILOCK). At 545, the process adds the current generation I/O count (e.g., cur_gen.gen_iocount) and the previous generation I/O count (e.g., prev_gen.gen_iocount). At 550, the process resets the current generation I/O count (e.g., to 0), and at 555, increments the current generation number (e.g., cur_gen.gen_number by 1). The process ends at 560 by setting an asynchronous write acknowledgement flag (e.g., VOL_FLAG_WR_ASYNC) on the data volume.

It will be appreciated that SRL 145, which is a front end log with back end log capabilities implemented on a primary site, ensures write order fidelity while switching write acknowledgement modes of data volumes. SRL 145 maintains data consistency by tracking writes on the primary site in the order in which those writes are received, and applying those writes on a secondary site in the same order. SRL 145 in conjunction with I/O tracking log 185 can also be used to switch write acknowledgement modes of data volumes in a cluster environment, while maintaining write order fidelity.

Figure 6A:
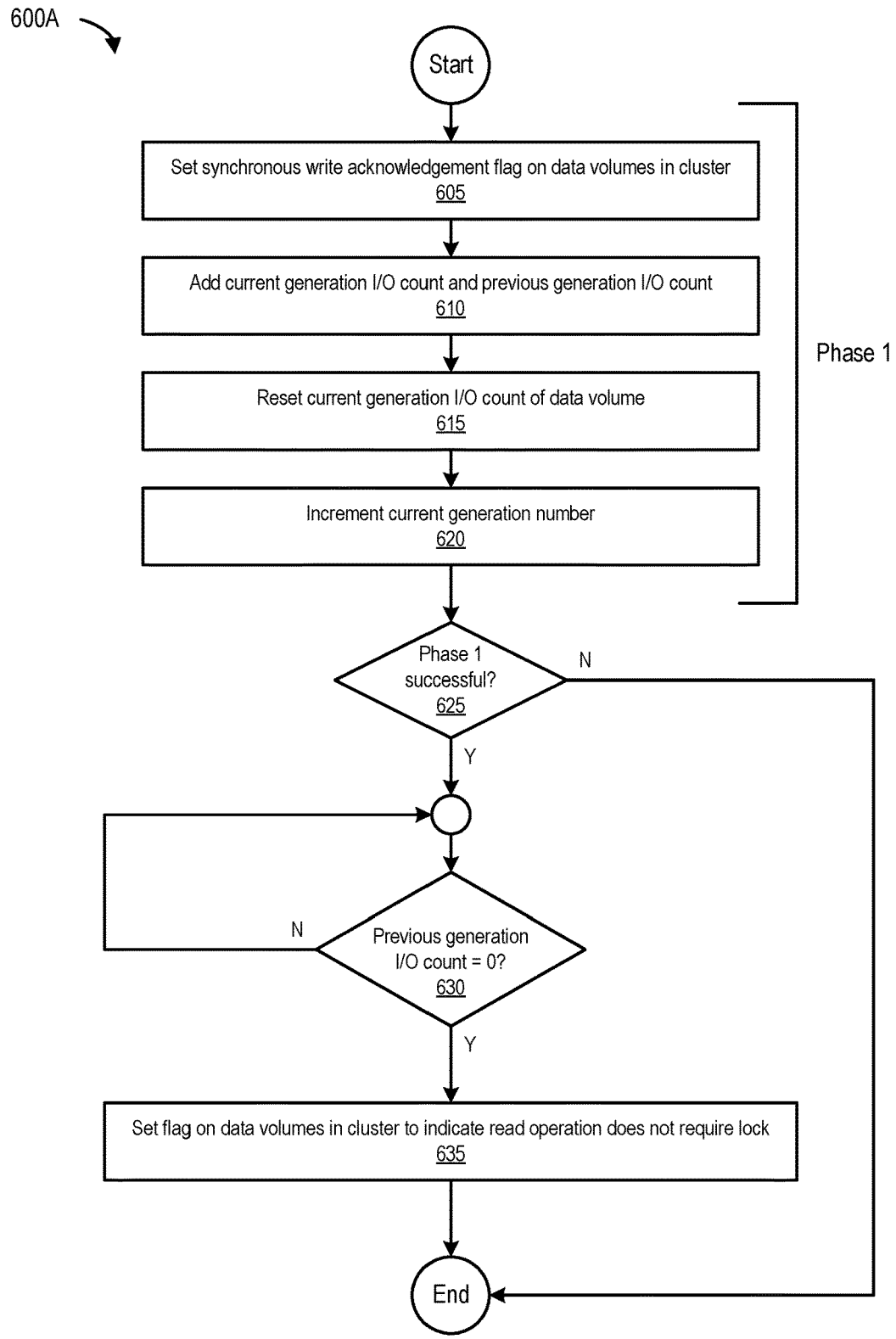
FIG. 6A is a flowchart that illustrates a process for switching a write acknowledgement mode in a cluster, according to one embodiment of the present disclosure.

FIG. 6A is a flowchart that illustrates a process 600A for switching a write acknowledgement mode of data volumes from asynchronous to synchronous in a cluster, according to one embodiment. The process begins at 605 by setting a synchronous write acknowledgement flag (e.g., VOL_FLAG_WR_SYNC) on data volumes (e.g., data volumes 155(1)-(N)) in a cluster (e.g., cluster 199). At 610, the process adds the current generation I/O count (e.g., cur_gen.gen_iocount) to the previous generation I/O count (e.g., prev_gen.gen_iocount), and at 615, the resets the current generation I/O count (e.g., cur_gen.gen_iocount to 0). At 620, the process increments the current generation number (e.g., cur_gen.gen_number by 1).

At 625, the process determines whether Phase 1 is successful. If Phase 1 is unsuccessful, the process ends. However, if Phase 1 is successful, the process, at 630 determines whether the previous generation I/O count (e.g., prev_gen.gen_iocount) is 0. If the previous generation I/O count is not 0, the process loops back to 630. However, if the previous generation I/O count is zero, the process ends at 635 by setting a flag on the data volumes to indicate that a read operation does not require a lock (e.g., VOL_FLAG_RD_NOILOCK).

Figure 6B:
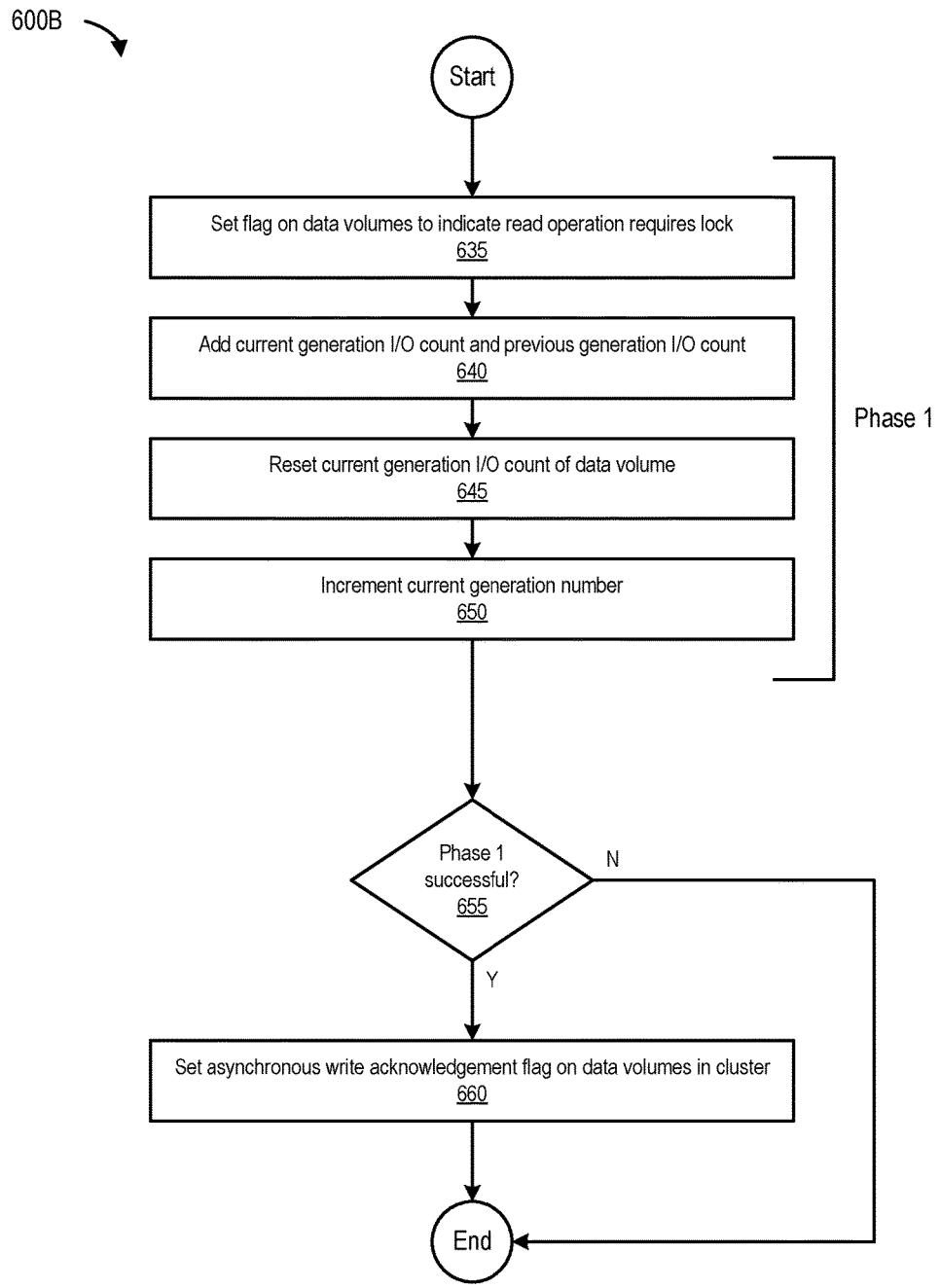
FIG. 6B is a flowchart that illustrates a process for switching a write acknowledgement mode in a cluster, according to one embodiment of the present disclosure.

FIG. 6B is a flowchart that illustrates a process 600B for switching a write acknowledgement mode of data volumes from synchronous to asynchronous in a cluster, according to one embodiment. The process begins at 635 by setting a flag on data volumes (e.g., data volumes 155(1)-(N) in cluster 199) to indicate that a read operation requires a lock (e.g., VOL_FLAG_RD_ILOCK). At 640, the process adds the current generation I/O count (e.g., cur_gen.gen_iocount) to the previous generation I/O count (e.g., prev_gen.gen_iocount), and at 645, resets the current generation I/O count (e.g., cur_gen.gen_iocount to 0).

At 650, the process increments the current generation number (e.g., cur_gen.gen_number by 1). At 655, the process determines whether Phase 1 is successful. If Phase 1 is unsuccessful, the process ends. However, if Phase 1 is successful, the process ends at 660 by setting an asynchronous write acknowledgement flag on the data volumes in the cluster (e.g., VOL_FLAG_WR_ASYNC).

It will be appreciated that the processes of FIGS. 5A, 5B, 6A, and 6B can be used to switch write acknowledgement modes of data volumes in a clustered and non-clustered environments. Switching write acknowledgement modes of data volumes from synchronous to asynchronous and vice-versa in such environments can incur associated costs (e.g., switching write acknowledgement modes of data volumes during ongoing I/O operations can disturb and/or stall an application). Therefore, it is preferable to switch write acknowledgement modes without blocking or quiescing application I/O operations while switching write acknowledgement modes of data volumes.

It will be appreciated that the processes of FIGS. 5A and 6A segregate (or separate) subsequent lock requests to a new generation, thus permitting pending I/O operations to complete before a no lock flag (e.g., VOL_FLAG_RD_NOILOCK) is set on a data volume to indicate that subsequent read requests do not need to be blocked. Further, it will also be appreciated that the processes of FIGS. 5B and 6B sets an asynchronous write acknowledgement flag (e.g., VOL_FLAG_WR_ASYNC) on a data volume to indicate that there is no need to wait for the previous generation of I/O operations to complete as subsequent read operations will be blocked, thus dissuading concerns related to supplying an application with stale data.

Figure 7A:
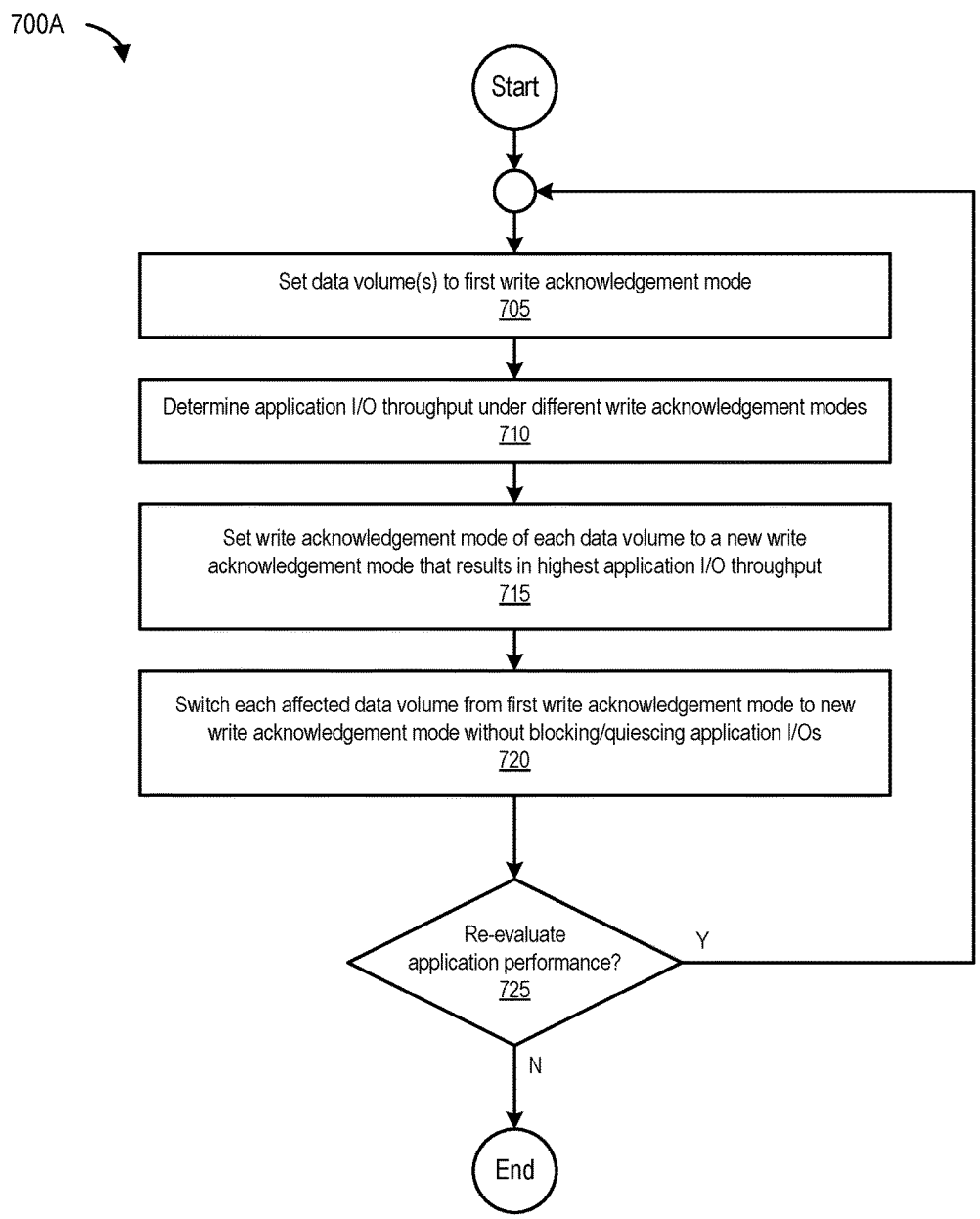
FIG. 7A is a flowchart that illustrates a process for improving application performance in replication environments, according to one embodiment of the present disclosure.

FIG. 7A is a flowchart that illustrates a process 700A for improving application performance in replication environments, according to one embodiment. The process begins at 705 by setting data volume(s) to a first write acknowledgement mode. At 710, the process determines application I/O throughput under different write acknowledgement modes. At 715, the process sets the write acknowledgement mode of each data volume to a new write acknowledgement mode that results in the highest application I/O throughput.

At 720, the process switches (or changes) the write acknowledgement mode of the data volumes from the first write acknowledgement mode to the new write acknowledgement mode without blocking/quiescing application I/Os. At 705, the process determines whether application performance has to be re-evaluated. If application performance has to be re-evaluated, the process loops back to 705. Otherwise, the process ends.

Figure 7B:
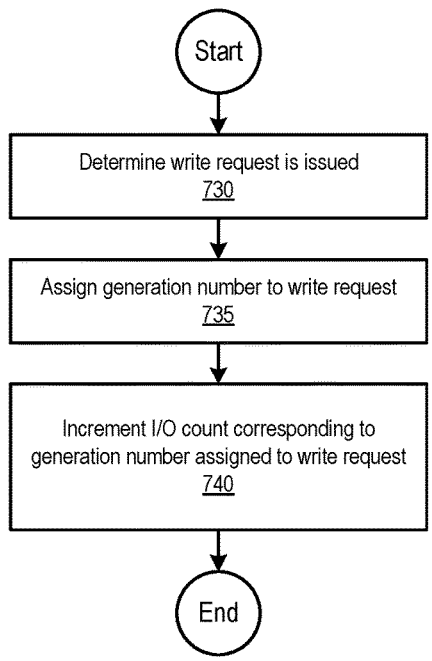
FIG. 7B is a flowchart that illustrates a process for processing a write operation, according to one embodiment of the present disclosure.

FIG. 7B is a flowchart that illustrates a process 700B for processing write operations, according to one embodiment. The process begins at 730 by determining whether a write request (e.g., a write operation) has been issued (e.g., by an application). At 735, the process assigns a generation number (e.g., gen_number) to the write request, and ends at 740 by incrementing an I/O count that corresponds to the generation number assigned to the write request.

Figure 7C:
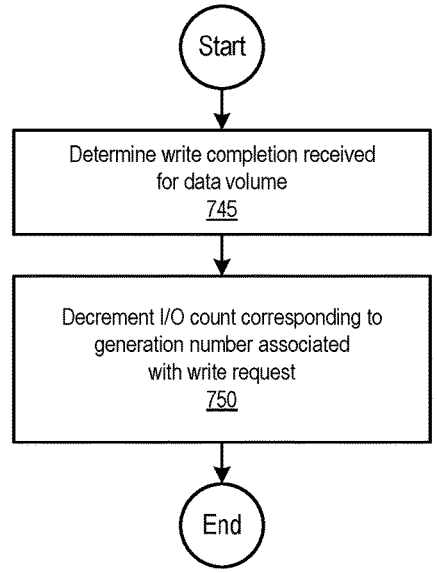
FIG. 7C is a flowchart that illustrates a process for processing completion of a write operation, according to one embodiment of the present disclosure.

FIG. 7C is a flowchart that illustrates a process 700C for processing completion of write operations, according to one embodiment. The process begins at 745 by determining that write completion has been received for a data volume (e.g., data has been committed or written to the data volume and write acknowledgement has been received by an application). The process ends at 750 by decrementing an I/O count that corresponds to the generation number associated with the write request.

Figures 7D, 7E:
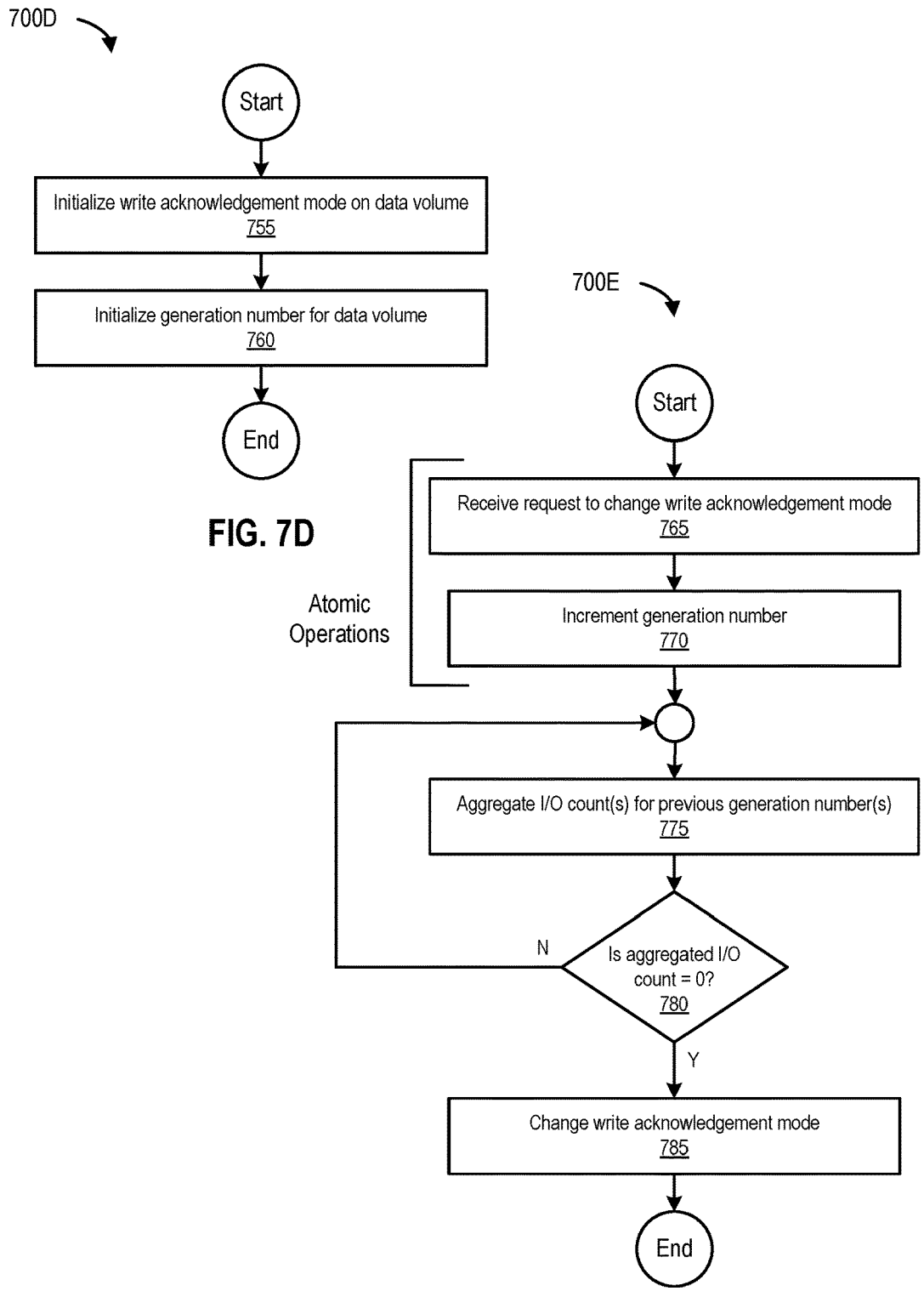
FIG. 7D is a flowchart that illustrates a process for initializing a write acknowledgement mode, according to one embodiment of the present disclosure.
FIG. 7E is a flowchart that illustrates a process for processing atomic operations, according to one embodiment of the present disclosure.

FIG. 7D is a flowchart that illustrates a process 700D for initializing write acknowledgement on a data volume, according to one embodiment. The process begins at 755 by initializing a write acknowledgement mode on a data volume. The process ends at 760 by initializing a generation number for the data volume.

FIG. 7E is a flowchart that illustrates a generic process 700E for switching write acknowledgement modes without blocking application I/O operations, according to one embodiment. The generic process 700E of FIG. 7E can be used to switch write acknowledgement modes from asynchronous to synchronous, and vice-versa. It should be noted that the processes of FIGS. 5B and 6B can be derived from the generic process 700E of FIG. 7E. The process begins at 765 by receiving a request to change a write acknowledgement mode of a data volume, and at 770, the process increments a generation number (associated with the data volume). It should be also noted that steps 765 and 770 of process 700E (changing generation) are atomic operations. At 775, the process aggregates I/O count(s) of previous generation number(s), and at 780, determines whether the aggregated I/O count is equal to 0. If the aggregated I/O count is not equal to 0, the process loops back to 775. However, if the aggregated I/O count is equal to 0, the process ends at 785 by changing the write acknowledgement mode.

Example Computing Environment

Figure 8:
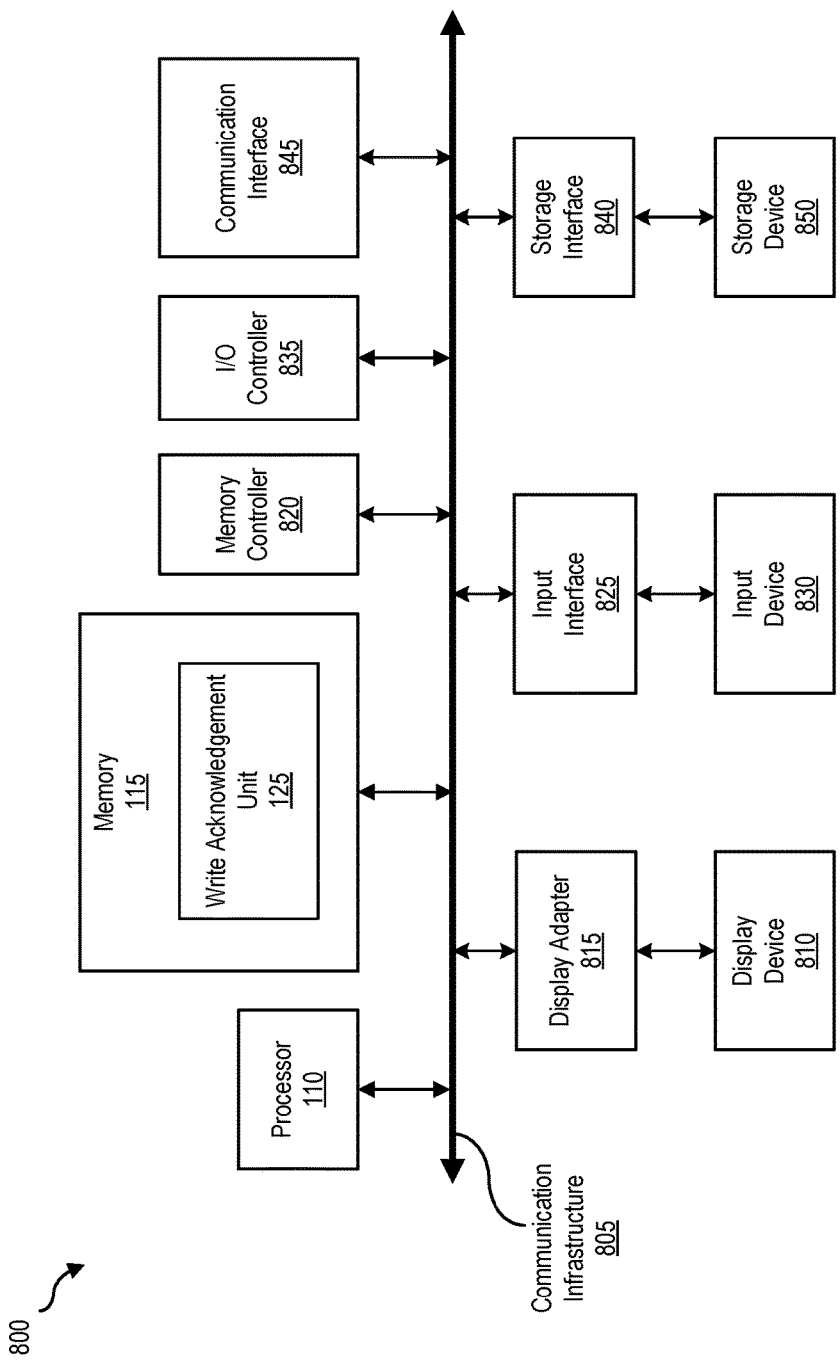
FIG. 8 is a block diagram of a computing system, illustrating how a write acknowledgement unit can be implemented in software, according to one embodiment of the present disclosure.

FIG. 8 is a block diagram of a computing system, illustrating how a write acknowledgement unit can be implemented in software, according to one embodiment. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 110 and a memory 115. By executing the software that implements computing device 105, computing system 800 becomes a special purpose computing device that is configured to improve application performance in replication environments.

Processor 110 generally represents any type or form of processing unit capable of processing data or interpreting and executing instructions. In certain embodiments, processor 110 may receive instructions from a software application or module. These instructions may cause processor 110 to perform the functions of one or more of the embodiments described and/or illustrated herein. For example, processor 110 may perform and/or be a means for performing all or some of the operations described herein. Processor 110 may also perform and/or be a means for performing any other operations, methods, or processes described and/or illustrated herein.

Memory 115 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing an access pattern tracker and a metadata read-ahead generator may be loaded into memory 115.

In certain embodiments, computing system 800 may also include one or more components or elements in addition to processor 110 and/or memory 115. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 110, memory 115, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of one or more computing devices such as computing device 105. For example, in certain embodiments I/O controller 835 may control or facilitate transfer of data between one or more elements of computing system 800, such as processor 110, memory 115, communication interface 845, display adapter 815, input interface 825, and/or storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 (e.g., local storage device 140 and/or primary storage device 150) coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. Storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860 and/or various portions of storage device 850. When executed by processor 110, a computer program loaded into computing system 800 may cause processor 110 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
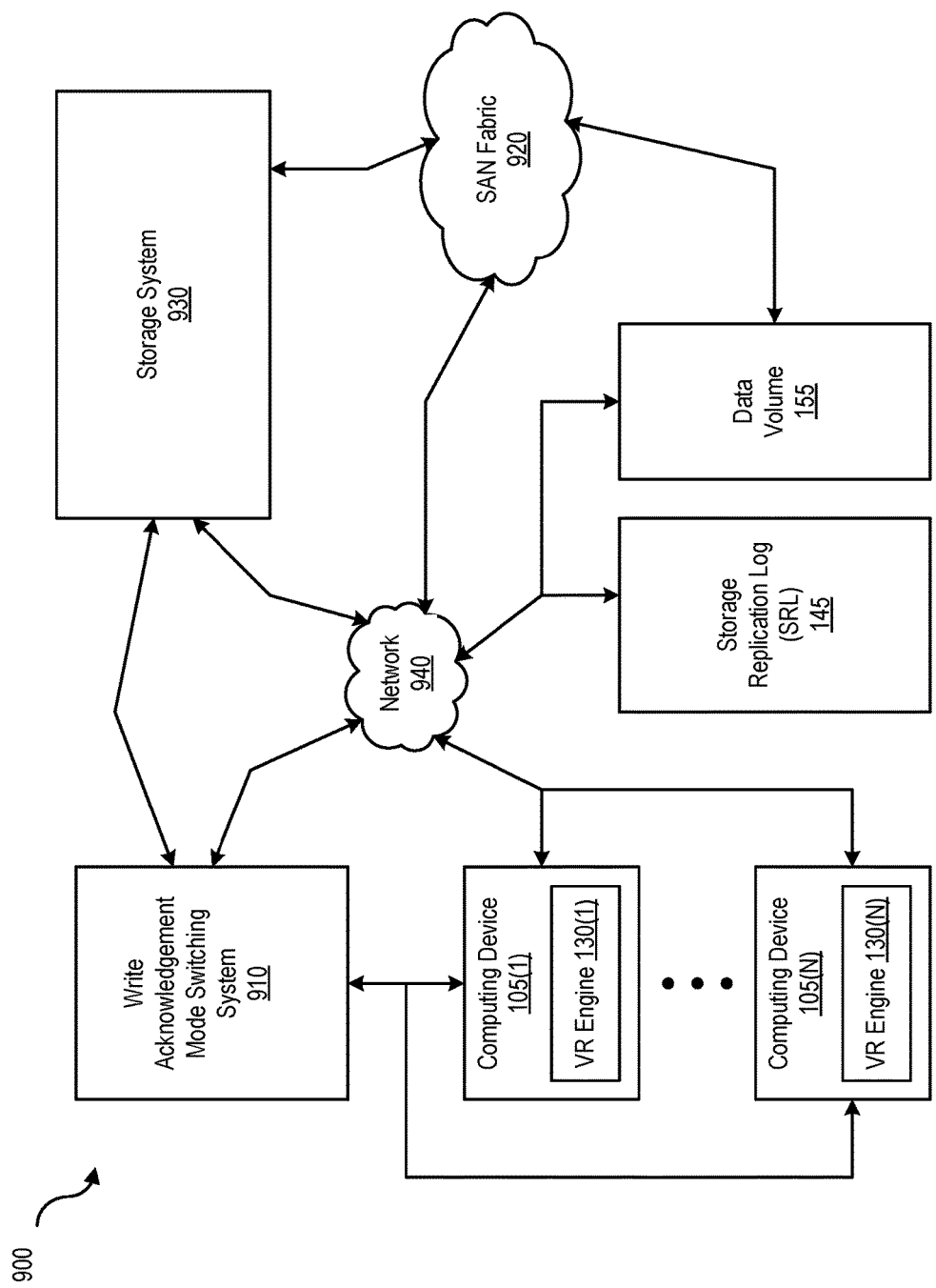
FIG. 9 is a block diagram of a networked system, illustrating how various computing devices can communicate via a network, according to one embodiment of the present disclosure.

FIG. 9 is a block diagram of a networked system 900, illustrating how various devices can communicate via a network, according to one embodiment. In certain embodiments, network-attached storage (NAS) devices may be configured to communicate with computing device 105 and storage system 930 using various protocols, such as Network File System (NFS), Server Message Block (SMB), or Common Internet File System (CIFS), among others.

Network 940 generally represents any type or form of computer network or architecture capable of facilitating communication between computing device 105, local storage device 140, primary storage device 150, and/or secondary site 160. In certain embodiments, a communication interface, such as communication interface 845 in FIG. 8, may be used to provide connectivity between computing device 105, local storage device 140, primary storage device 150, and/or secondary site 160, and network 940. It should be noted that the embodiments described and/or illustrated herein are not limited to the Internet or any particular network-based environment. For example, network 940 can be a Storage Area Network (SAN). Computing device 105 and local storage device 140 can be integrated or separate. If separate, for example, computing device 105 and local storage device 140 can be coupled by a local connection (e.g., using Bluetooth™, Peripheral Component Interconnect (PCI), Small Computer System Interface (SCSI), or the like), or via one or more networks such as the Internet, a LAN, or a SAN.

In one embodiment, all or a portion of one or more of the disclosed embodiments may be encoded as a computer program and loaded onto and executed by computing device 105. All or a portion of one or more of the embodiments disclosed herein may also be encoded as a computer program, stored on computing device 105 and/or secondary site 160, and distributed over network 940, SAN 170, and/or network 175.

In some examples, all or a portion of computing device 105 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, computing device 105 (e.g., VR Engine 130) may transform the behavior of computing device 105 in order to cause computing device 105 to improve application performance in replication environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
   receiving a read command, wherein
      the read command is configured to cause a read operation to be performed on a unit of storage, and
      the unit of storage is comprised in a data volume;
   determining a state of a lock, wherein
      the state of the lock indicates whether a write operation is ongoing,
      the write operation results in
         writing data to a location in a storage replication log corresponding to the unit of storage, and
         writing the data to a location in the data volume corresponding to the unit of storage, and
      a determination that the write operation is not ongoing is made only if the writing the data to the location in the storage replication log, and the writing the data to the location in the data volume, have both been completed; and
   in response to a determination that the state of the lock indicates that the write operation is not ongoing, allowing the read operation to be performed on the unit of storage.

2. The computer-implemented method of claim 1, further comprising:
   assigning a current generation number to the data volume; and
   receiving a first request to lock the data volume, wherein
      the first request is received due to the write operation, and
      the write operation is asynchronous.

3. The computer-implemented method of claim 2, further comprising:
   upon receiving the first request,
      assigning the current generation number to the first request,
      setting a synchronous write acknowledgement flag on the data volume,
      resetting a current generation input/output count of the data volume to zero, and
      incrementing the current generation number by one.

4. The computer-implemented method of claim 3, further comprising:
   switching the data volume from a first write acknowledgement mode to a second write acknowledgement mode; and
   receiving a second request to lock the data volume to the read operation, wherein
      the second request is received due to the write operation, and
      the write operation is synchronous and ongoing by virtue of the data volume being switched to the second write acknowledgement mode.

5. The computer-implemented method of claim 4, further comprising:
   upon receiving the second request and switching the data volume to the second write acknowledgement mode,
      assigning the current generation number to the second request,
      setting a no lock flag on the data volume to indicate that the read operation does not require the lock,
      resetting the current generation input/output count of the data volume to zero, and
      incrementing the current generation number by one; and
   setting an asynchronous write acknowledgement flag on the data volume.

6. The computer-implemented method of claim 5, further comprising:
   determining that the read operation or the write operation is associated with one or more computing devices operating in a cluster, wherein
      the data volume is part of a plurality of data volumes, and
      the plurality of data volumes are part of the cluster; and
   setting a synchronous write acknowledgement flag on each of the plurality of data volumes;

resetting the current generation input/output count of the plurality of data volumes to zero;
incrementing the current generation number by one;
waiting for a previous generation input/output count to become zero; and
setting a no lock flag on each of the plurality of data volumes.

7. The computer-implemented method of claim 6, further comprising:
setting the no lock flag on the plurality of data volumes;
resetting the current generation input/output count of the plurality of data volumes to zero;
incrementing the current generation number by one; and
setting the asynchronous write acknowledgement flag on the plurality of data volumes.

8. A non-transitory computer readable storage medium comprising program instructions executable to:
receive a read command, wherein
the read command is configured to cause a read operation to be performed on a unit of storage, and
the unit of storage is comprised in a data volume;
determine a state of a lock, wherein
the state of the lock indicates whether a write operation is ongoing, and
the write operation results in
writing data to a location in a storage replication log corresponding to the unit of storage, and
writing the data to a location in the data volume corresponding to the unit of storage, and
a determination that the write operation is not ongoing is made only if the writing the data to the location in the storage replication log, and the writing the data to the location in the data volume, have both been completed; and
in response to a determination that the state of the lock indicates that the write operation is not ongoing, allow the read operation to be performed on the unit of storage.

9. The non-transitory computer readable storage medium of claim 8, further comprising:
assigning a current generation number to the data volume; and
receiving a first request to lock the data volume, wherein
the first request is received due to the write operation, and
the write operation is asynchronous.

10. The non-transitory computer readable storage medium of claim 9, further comprising:
upon receiving the first request,
assigning the current generation number to the first request,
setting a synchronous write acknowledgement flag on the data volume,
resetting a current generation input/output count of the data volume to zero, and
incrementing the current generation number by one.

11. The non-transitory computer readable storage medium of claim 10, further comprising:
switching the data volume from a first write acknowledgement mode to a second write acknowledgement mode; and
receiving a second request to lock the data volume to the read operation, wherein
the second request is received due to the write operation, and
the write operation is synchronous and ongoing by virtue of the data volume being switched to the second write acknowledgement mode.

12. The non-transitory computer readable storage medium of claim 11, further comprising:
upon receiving the second request and switching the data volume to the second write acknowledgement mode,
assigning the current generation number to the second request,
setting a no lock flag on the data volume to indicate that the read operation does not require the lock,
resetting the current generation input/output count of the data volume to zero, and
incrementing the current generation number by one; and
setting an asynchronous write acknowledgement flag on the data volume.

13. The non-transitory computer readable storage medium of claim 12, further comprising:
determining that the read operation or the write operation is associated with one or more computing devices operating in a cluster, wherein
the data volume is part of a plurality of data volumes, and
the plurality of data volumes are part of the cluster; and
setting a synchronous write acknowledgement flag on each of the plurality of data volumes;
resetting the current generation input/output count of the plurality of data volumes to zero;
incrementing the current generation number by one;
waiting for a previous generation input/output count to become zero; and
setting a no lock flag on each of the plurality of data volumes.

14. The non-transitory computer readable storage medium of claim 13, further comprising:
setting the no lock flag on the plurality of data volumes;
resetting the current generation input/output count of the plurality of data volumes to zero;
incrementing the current generation number by one; and
setting the asynchronous write acknowledgement flag on the plurality of data volumes.

15. A system comprising:
one or more processors; and
a memory coupled to the one or more processors, wherein
the memory stores program instructions executable by the one or more processors to
receive a read command, wherein
the read command is configured to cause a read operation to be performed on a unit of storage, and
the unit of storage is comprised in a data volume,
determine a state of a lock, wherein
the state of the lock indicates whether a write operation is ongoing, and
the write operation results in
writing data to a location in a storage replication log corresponding to the unit of storage, and
writing the data to a location in the data volume corresponding to the unit of storage, and
a determination that the write operation is not ongoing is made only if the writing the data to the location in the storage replication log, and the writing the data to the location in the data volume, have both been completed, and in response to a determination that the state of the lock indicates that the write operation is not ongoing, allow the read operation to be performed on the unit of storage.

16. The system of claim 15, further comprising:
assigning a current generation number to the data volume; and
receiving a first request to lock the data volume, wherein
the first request is received due to the write operation, and
the write operation is asynchronous.

17. The system of claim 16, further comprising:
upon receiving the first request,
assigning the current generation number to the first request,
setting a synchronous write acknowledgement flag on the data volume,
resetting a current generation input/output count of the data volume to zero, and
incrementing the current generation number by one.

18. The system of claim 17, further comprising:
switching the data volume from a first write acknowledgement mode to a second write acknowledgement mode;
receiving a second request to lock the data volume to the read operation, wherein
the second request is received due to the write operation, and
the write operation is synchronous and ongoing by virtue of the data volume being switched to the second write acknowledgement mode;
upon receiving the second request and switching the data volume to the second write acknowledgement mode,
assigning the current generation number to the second request,
setting a no lock flag on the data volume to indicate that the read operation does not require the lock,
resetting the current generation input/output count of the data volume to zero, and
incrementing the current generation number by one; and
setting an asynchronous write acknowledgement flag on the data volume.

19. The system of claim 18, further comprising:
determining that the read operation or the write operation is associated with one or more computing devices operating in a cluster, wherein
the data volume is part of a plurality of data volumes, and
the plurality of data volumes are part of the cluster; and
setting a synchronous write acknowledgement flag on each of the plurality of data volumes;
resetting the current generation input/output count of the plurality of data volumes to zero;
incrementing the current generation number by one;
waiting for a previous generation input/output count to become zero; and
setting a no lock flag on each of the plurality of data volumes.

20. The system of claim 19, further comprising:
setting the no lock flag on the plurality of data volumes;
resetting the current generation input/output count of the plurality of data volumes to zero;
incrementing the current generation number by one; and
setting the asynchronous write acknowledgement flag on the plurality of data volumes.

* * * * *